(12) United States Patent
Willen et al.

(10) Patent No.: US 7,844,517 B2
(45) Date of Patent: Nov. 30, 2010

(54) SYSTEM, METHOD, AND COMPUTER PROGRAM PRODUCT FOR FORECASTING WEATHER-BASED DEMAND USING PROXY DATA

(75) Inventors: Michael A. Willen, Thorndale, PA (US); David G. Estornell, Lincoln University, PA (US); William E. Kirk, Easton, PA (US); Eli H. Miller, Sumneytown, PA (US); Paul E. Walsh, Downingtown, PA (US)

(73) Assignee: Planalytics, Inc., Berwyn, PA (US)

( * ) Notice: Subject to any disclaimer, the term of this patent is extended or adjusted under 35 U.S.C. 154(b) by 1205 days.

(21) Appl. No.: 10/705,758

(22) Filed: Nov. 12, 2003
(Under 37 CFR 1.47)

(65) Prior Publication Data

US 2004/0225556 A1  Nov. 11, 2004

Related U.S. Application Data

(63) Continuation-in-part of application No. 09/656,397, filed on Sep. 6, 2000, now Pat. No. 7,069,232, which is a continuation-in-part of application No. 09/097,714, filed on Jun. 16, 1998, now Pat. No. 7,103,560, which is a continuation of application No. 08/588,248, filed on Jan. 18, 1996, now Pat. No. 5,832,456.

(51) Int. Cl.
*G06Q 40/00* (2006.01)
(52) U.S. Cl. .......................................... 705/35; 705/37
(58) Field of Classification Search ................. None
See application file for complete search history.

(56) References Cited

U.S. PATENT DOCUMENTS 3,808,410 A  4/1974  Schlesinger 4,015,366 A  4/1977  Hall, III
4,040,629 A  8/1977  Kelly (Continued)

FOREIGN PATENT DOCUMENTS

CA  2 153976 C  7/1994

(Continued)

OTHER PUBLICATIONS

Zeng, L., "Pricing Weather Derivatives", Journal of Risk Finance, Spring 2000, as printe at http://www.atmos.washington.deu/Ixin/zeng2000.pdf pp. 72-78.*

(Continued)

*Primary Examiner*—Thomas Dixon
*Assistant Examiner*—Gerald C Vizvary
(74) *Attorney, Agent, or Firm*—Sterne, Kessler, Goldstein & Fox P.L.L.C.

(57) ABSTRACT

Weather metrics data and a weather factor relationship knowledgebase are received and used to forecast the weather-based demand. The weather factor relationship knowledgebase can be a weather-impact model. The weather-impact model can comprise at least one of an empirical scoring matrix, a weather indices template, and a proxy model conditions template. The weather-impact model can be derived from an analysis of normalized proxy sales history data. Optionally, the weather-based demand can be scaled, deaggregated, or both.

21 Claims, 10 Drawing Sheets

U.S. PATENT DOCUMENTS

| | | | |
|---|---|---|---|
| 4,218,755 A | 8/1980 | Root | |
| 4,342,125 A | 8/1982 | Hodge | |
| 4,580,814 A | 4/1986 | Berler | |
| 4,626,992 A | 12/1986 | Greaves et al. | |
| 4,642,775 A | 2/1987 | Cline et al. | |
| 4,766,539 A | 8/1988 | Fox | |
| 4,784,150 A | 11/1988 | Voorhies et al. | |
| 5,063,506 A | 11/1991 | Brockwell et al. | |
| 5,128,861 A | 7/1992 | Kagami et al. | |
| 5,128,862 A | 7/1992 | Mueller et al. | |
| 5,130,925 A | 7/1992 | Janes et al. | |
| 5,140,523 A | 8/1992 | Frankel et al. | |
| 5,168,445 A | 12/1992 | Kawashima et al. | |
| 5,189,606 A | 2/1993 | Burns et al. | |
| 5,208,665 A | 5/1993 | McCalley et al. | |
| 5,237,496 A | 8/1993 | Kagami et al. | |
| 5,250,941 A | 10/1993 | McGregor et al. | |
| 5,253,165 A | 10/1993 | Leiseca et al. | |
| 5,253,181 A | 10/1993 | Marui et al. | |
| 5,263,167 A | 11/1993 | Conner, Jr. et al. | |
| 5,283,865 A | 2/1994 | Johnson | |
| 5,295,064 A | 3/1994 | Malec et al. | |
| 5,295,069 A | 3/1994 | Hersey et al. | |
| 5,309,355 A | 5/1994 | Lockwood | |
| 5,342,144 A | 8/1994 | McCarthy | |
| 5,377,095 A | 12/1994 | Maeda et al. | |
| 5,444,820 A | 8/1995 | Tzes et al. | |
| 5,491,629 A | 2/1996 | Fox et al. | |
| 5,504,675 A | 4/1996 | Cragun et al. | |
| 5,521,813 A | 5/1996 | Fox et al. | |
| 5,654,886 A | 8/1997 | Zereski, Jr. et al. | |
| 5,673,366 A | 9/1997 | Maynard et al. | |
| 5,692,233 A | 11/1997 | Garman | |
| 5,712,985 A | 1/1998 | Lee et al. | |
| 5,740,549 A | 4/1998 | Reilly et al. | |
| 5,753,784 A | 5/1998 | Fischer et al. | |
| 5,768,586 A | 6/1998 | Zweben et al. | |
| 5,787,283 A | 7/1998 | Chin et al. | |
| 5,796,611 A | 8/1998 | Ochiai et al. | |
| 5,796,932 A * | 8/1998 | Fox et al. ................. | 707/104.1 |
| 5,832,456 A | 11/1998 | Fox et al. | |
| 5,848,378 A | 12/1998 | Shelton et al. | |
| 5,855,006 A | 12/1998 | Huemoeller et al. | |
| 5,870,302 A | 2/1999 | Oliver | |
| 5,884,286 A | 3/1999 | Daughtery, III | |
| 5,909,671 A | 6/1999 | Byford et al. | |
| 5,946,662 A | 8/1999 | Ettl et al. | |
| 5,974,395 A | 10/1999 | Bellini et al. | |
| 5,978,738 A | 11/1999 | Brown | |
| 5,979,363 A | 11/1999 | Shaar | |
| 5,983,200 A | 11/1999 | Slotznick | |
| 5,999,882 A | 12/1999 | Simpson et al. | |
| 6,002,863 A | 12/1999 | Sheer et al. | |
| 6,009,407 A | 12/1999 | Garg | |
| 6,012,834 A | 1/2000 | Dueck et al. | |
| 6,014,606 A | 1/2000 | Tu | |
| 6,018,317 A * | 1/2000 | Dogan et al. ................. | 342/378 |
| 6,018,640 A | 1/2000 | Blackman et al. | |
| 6,021,402 A | 2/2000 | Takriti | |
| 6,035,285 A | 3/2000 | Schlect et al. | |
| 6,061,662 A | 5/2000 | Makivic | |
| 6,067,525 A | 5/2000 | Johnson et al. | |
| 6,078,901 A | 6/2000 | Ching | |
| 6,104,582 A | 8/2000 | Cannon et al. | |
| 6,108,662 A | 8/2000 | Hoskins et al. | |
| 6,144,944 A | 11/2000 | Kurtzman et al. | |
| 6,151,582 A | 11/2000 | Huang et al. | |
| 6,173,276 B1 | 1/2001 | Kant et al. | |
| 6,188,960 B1 | 2/2001 | Baron et al. | |
| 6,216,109 B1 | 4/2001 | Zweben et al. | |
| 6,240,369 B1 | 5/2001 | Foust | |
| 6,263,321 B1 | 7/2001 | Daughtery, III | |
| 6,298,285 B1 | 10/2001 | Addink et al. | |
| 6,298,307 B1 | 10/2001 | Murphy et al. | |
| 6,317,686 B1 | 11/2001 | Ran | |
| 6,321,212 B1 * | 11/2001 | Lange ...................... | 705/36 R |
| 6,339,747 B1 | 1/2002 | Daly et al. | |
| 6,341,287 B1 | 1/2002 | Sziklai et al. | |
| 6,356,842 B1 | 3/2002 | Intriligator et al. | |
| 6,397,162 B1 | 5/2002 | Ton | |
| 6,405,134 B1 | 6/2002 | Smith et al. | |
| 6,405,179 B1 | 6/2002 | Rebane | |
| 6,418,417 B1 | 7/2002 | Corby et al. | |
| 6,453,215 B1 | 9/2002 | Lavoie | |
| 6,453,216 B1 | 9/2002 | McCabe et al. | |
| 6,473,084 B1 * | 10/2002 | Phillips et al. ............... | 345/440 |
| 6,496,780 B1 | 12/2002 | Harris et al. | |
| 6,498,987 B1 | 12/2002 | Kelly et al. | |
| 6,505,123 B1 | 1/2003 | Root et al. | |
| 6,535,817 B1 | 3/2003 | Krishnamurti | |
| 6,581,008 B2 | 6/2003 | Intriligator et al. | |
| 6,584,447 B1 | 6/2003 | Fox et al. | |
| 6,591,255 B1 | 7/2003 | Tatum et al. | |
| 6,654,689 B1 | 11/2003 | Kelly et al. | |
| 6,753,784 B1 | 6/2004 | Sznaider et al. | |
| 6,985,837 B2 | 1/2006 | Moon et al. | |
| 7,031,927 B1 | 4/2006 | Beck et al. | |
| 7,069,232 B1 | 6/2006 | Fox et al. | |
| 7,080,018 B1 | 7/2006 | Fox et al. | |
| 7,103,560 B1 | 9/2006 | Fox et al. | |
| 7,130,789 B2 | 10/2006 | Glodjo et al. | |
| 7,162,444 B1 | 1/2007 | Machado, Jr. et al. | |
| 7,184,965 B2 | 2/2007 | Fox et al. | |
| 7,184,983 B2 | 2/2007 | Corby et al. | |
| 2002/0026284 A1 | 2/2002 | Brown | |
| 2002/0032644 A1 * | 3/2002 | Corby et al. ................... | 705/37 |
| 2002/0038217 A1 | 3/2002 | Young | |
| 2002/0062594 A1 | 5/2002 | Erickson | |
| 2002/0084900 A1 | 7/2002 | Peterson et al. | |
| 2002/0091692 A1 | 7/2002 | Yoshida et al. | |
| 2002/0099640 A1 | 7/2002 | Lange | |
| 2002/0107638 A1 | 8/2002 | Intriligator et al. | |
| 2002/0130899 A1 | 9/2002 | Ryan et al. | |
| 2002/0133385 A1 | 9/2002 | Fox et al. | |
| 2002/0178077 A1 | 11/2002 | Katz et al. | |
| 2002/0184126 A1 | 12/2002 | McIntyre, Jr. et al. | |
| 2002/0194099 A1 | 12/2002 | Weiss | |
| 2002/0194113 A1 | 12/2002 | Lof et al. | |
| 2002/0194148 A1 * | 12/2002 | Billet et al. .................... | 706/62 |
| 2003/0004780 A1 * | 1/2003 | Smith et al. .................... | 705/10 |
| 2003/0107490 A1 | 6/2003 | Sznaider et al. | |
| 2003/0126155 A1 * | 7/2003 | Parker et al. ............. | 707/104.1 |
| 2003/0130883 A1 | 7/2003 | Schroeder et al. | |
| 2003/0200027 A1 | 10/2003 | Root et al. | |
| 2004/0093296 A1 | 5/2004 | Phelan et al. | |
| 2004/0215394 A1 | 10/2004 | Carpenter et al. | |
| 2004/0230519 A1 | 11/2004 | Parker | |
| 2005/0021435 A1 | 1/2005 | Hakanoglu et al. | |
| 2005/0096947 A1 | 5/2005 | Fox et al. | |
| 2005/0108150 A1 | 5/2005 | Pethick et al. | |
| 2005/0119962 A1 | 6/2005 | Bowen et al. | |
| 2005/0154531 A1 | 7/2005 | Kelly et al. | |
| 2005/0177411 A1 | 8/2005 | Schuhn | |
| 2005/0216384 A1 | 9/2005 | Partlow et al. | |
| 2006/0247996 A1 | 11/2006 | Feldman | |
| 2006/0271461 A1 | 11/2006 | Chorna et al. | |
| 2006/0293980 A1 | 12/2006 | Corby et al. | |

FOREIGN PATENT DOCUMENTS

| | | |
|---|---|---|
| DE | 41 14 584 | 11/1991 |
| EP | 0954814 A1 | 11/1999 |
| EP | 0954814 B1 | 4/2006 |
| FR | 2 751 774 | 7/1996 |

| | | |
|---|---|---|
| FR | 2 732 477 | 10/1996 |
| JP | 4-135271 | 5/1992 |
| JP | 9-128411 | 5/1997 |
| JP | 10-96790 | 4/1998 |
| JP | 10-332840 | 12/1998 |
| JP | 11-258359 | 9/1999 |
| WO | WO 94/16394 | 7/1994 |
| WO | WO 95/24012 A1 | 9/1995 |
| WO | WO 98/22899 | 5/1998 |
| WO | WO 02/21381 A2 | 3/2002 |
| WO | WO 2007/002454 | 1/2007 |

OTHER PUBLICATIONS

Banham, R., "Reinsurers Seek Relief in Computer Predictions", Aug. 1993.*
Gotschall, Mary G.,"Bullish on weather", Electrical perspectives, Washington vol. 23, No. 5, (Sep./Oct. 1998).*
World's First Financial Weather Index Acquired by Weather Board of Trade PR Newswire. New York: Apr. 16, 2002. p. 1.*
VanHorne, J.C. & Wachowicz, J.M. Fundamentals of Financial Management 11th Edition, Prentice Hall, Upper Saddle River, NJ 07458, 2001 pp. 409-411.*
Campsey, B.J. & Brigham, E.F. Introduction to Financial Management, CBS College Publishing NY, NY 10017, 1985 pp. 435-446.*
Kamen, E.W & Heck, B. Fundamentals of Signals and Systems Prentice Hall, Upper Saddle River, NJ 07458, 1997 pp. 378-379.*
Long, L. & Long, N. Computers 3rd Edition Prentice Hall, Upper Saddle River, NJ 07458, 1993 p. 53 & p. 648.*
http://www.irrigation.com—as Archived on Feb. 19, 1999.—A trade web site on golf, agriculture and landscape irrigation.
Helfrich, Greg; Haas, Greg; Dubin Gary, "Software developed for disinfection rule compliance", Water Engineering & Management, 1993.
Erickson, Paul, "Determination of Minimum Pool Level for Quabbin Reservoir on the Basis of Water Quality Constraints", 1966.
Price et al. "Adapting a Patch Model to Simulate the Sensitivity of Central-Canadian Boreal Ecosystems to Climate Variability." Journal of Biogeography, vol. 26, No. 5, pp. 1101-1113, Sep. 1999.
Reynolds, C.S. "The Ecosystems Approach to Water Management" (abstract only). Journal of Aquatic Ecosystem Stress and Recovery, vol. 2, No. 1, Mar. 1993.
Risser, Paul G. "The Status of the Science Examining Ecotones." BioScience, vol. 45, No. 5, p. 318(8), May 1995.
Kickert et al. "Predictive Modeling of Effects Under Global Change." Environmental Pollution 100 (103), pp. 87-132, 1999.
International Search Report issued Jan. 8, 2001 for PCT/US01/11915, 4 pages.
Banham, R., "Reinsurers Seek Relief in Computer Predictions", Aug. 1993, pp. 14-16, 18-19, XP002082269, p. 14, col. 1, line 1, col. 2, line 29.
Gagne, James, 'Fair-weather trends', May 1997, American Demographics, pp. 1-5.
Gotschall, Mary G., "Bullish on weather," *Electric Perspectives*, Washington, vol. 23, No. 5, p. 30, 8 pgs (Sep./Oct. 1998).
http://www.bysb.com/sponsors/weathr.htm.
Hunter, R., "Forecast for Weather Derivatives: Hot Derivatives Strategy," May 1999, pp. 1-6, XP002133864, as printed from http://derivatives.com/magazine/arrive/1998/0598feal.asp> p. 1, line 1—p. 6, line 9.
"Japan-US Business Report, American Companies in Japan," *Software and Information Services*, vol. 1997, No. 335, Aug. 31, 1997.
Karmin, Monroe W., "Inflation, Jobs and Interest Rates: Dangerous Territory," *U.S. News & World Report*, vol. 108, No. 19., p. 50, May 14, 1990.
Lucchetti, A., "Cold Winter on the Way? Some bet on it," *Wall Street Journal*, Nov. 6, 1997.
Malliaris, M., "Beating the Best: A Neutral Network Challenges the Black-Scholes Formula," *Proceedings of the Conference on Artificial Intelligence for Applications*, US, Los Alamitos, IEEE Comp. Soc. Press, 1993, pp. 445-449, XP000379639, ISBN; 0-8186-3840-0, p. 445, col. 1., line 16, p. 446, col. 1, line 17.

"Microsoft Expedia Travel Services Debuts on the Web," PR Newswire, Oct. 22, 1996.
Ojala, Marydee, "The dollar sign: Weather databases online," Database, vol. 18, No. 1, pp. 72-76, Feb./Mar. 1995.
"Origins of Option Pricing Techniques", "The Black and Scholes Model", "The Black and Scholes Model" and "Graphs of the Black Scholes Model", as printed from http://bradley.bradley.edu/.about.arr/bsm, Apr. 9, 1997, (8 pages).
Pizano, A. et al., "Automatic Generation of Graphical User Interfaces for Interactive Database Applicaitons," *Proceedings of the 1993 International Conference on Information and Knowledge Management*, Association for Computing Machinery, pp. 344-355 (Nov. 1993), XP009035258.
Rao, S.R.;Thomas, Edward G; Javalgi, Rajshekhar G., 'Activity Preferences and Trip-Planning Behavior of the U.S. Outbound Pleasure Travel Market', Winter, 1992, Journal of Travel Research, pp. 1-12.
Schwartz, S., "Modeling tools aid in financial risk management," *Insurance & Technology*, vol. 21, No. 4, pp. 20-21 (Apr. 1996).
"Skyline Multimedia Entertainment, Inc. Announces Co-Marketing Pact With Internet's InfoSpace.com; Deal Marks Theme Entertainment Company's Expansion Into Tour Industry Services," Business Wire, Sep. 4, 1998.
Stix, G., "A Calculus of Risk," *Scientific American*, pp. 92-97 (May 1998).
Studwell, A., "Weather Derivatives," $11^{th}$ *Conference on Applied Climatology*, Jan. 10-15, 1999, pp. 36-40, XP00089822, p. 36, col. 1, line 1-p. 40, col. 1, line 33.
Turvey, Calum G., "Weather Derivatives and Specific Event Risk," *Proceedings of the 1999 American Agricultural Economics Association Annual Meeting*, American Agricultural Economics Association (Aug. 1999).
Turvey, Calum, "Weather Derivatives for Specific Event Risks in Agriculture," *Review of Agricultural Economics*, American Agricultural Economics Association, vol. 23, No. 2, pp. 333-351 (Spring/Summer 2001).
Upbin, B., "Betting against God," *Forbes*, vol. 162, No. 1, p. 108(1) (Jul. 6, 1998).
'Urilicorp's Aquila energy to Greatly Expand it's Weather Hedging Products', Nov. 20, 1997, McGraw-Hill Publications, vol. 17, No. 1, p. 4.
"WeatherPlanner Introduces Weather Forecasting Service for Consumers and Small Businesses," PR Newswire, Nov. 11, 1997.
"WeatherPlanner Introduces Weather Forecasting Service for Skiers; Revolutionary Planning Tool Provides Forecasts up to 12 Months in Advance," PR Newswire, Dec. 12, 1997.
"WeatherPlanner Introduces Weather Forecasting Service for Vacationers; Revolutionary Planning Tool Provides Forecasts up to 12 Months in Advance," PR Newswire, Mar. 19, 1998.
"WeatherPlanner Introduces Weather Forecasting Service to Aid Brides in Planning Weddings and Honeymoons," PR Newswire, Dec. 9, 1997.
"WeatherPlanner Offers Weather Forecasting Service for Outdoor Enthusiasts; Weather Forecasts Now Available up to 12 Months in Advance," PR Newswire, Mar. 6, 1998.
"WeatherPlanner Tees Up Weather Forecasting Service for Golfers; Weather Forecasts Now Available up to 12 Months in Advance," PR Newswire, May 5, 1998.
"Web WeatherPlanner Site for Weather Predictions," Newsbytes News Network, Dec. 12, 1997.
Williams, Michael et al., "Natural Gas Trends," Railroad Commission of Texas Gas Services Division Regulatory Analysis & Policy Section, Jul. 28, 2003.
www.intellicast.com, Screen Print, Jul. 4, 1998.
wysiwyg://171/http://www.aquilaenergy.com/northamerica/about/.
English Abstract of French Patent Publication No. 2 751 774, 1 page, data supplied from the espEcenet database.
English Abstract of Japanese Patent Publication No. 9-128411, 1 page, data supplied from the esp@cenet database.
English Abstract Page for Japanese Patent Publication No. 10332840, 1 page, data supplied from the esp@cenet database.
International Search Report from PCT Appl. No. PCT/US93/11005, 6 pages, mailed Jun. 27, 1994.

International Search Report from PCT Appl. No. PCT/US95/00618, 5 pages, mailed May 3, 1995.
International Search Report from PCT Appl. No. PCT/US95/02557, 4 pages, mailed Jun. 8, 1995.
International Search Report from PCT Appl. No. PCT/US97/01075, 5 pages, mailed May 14, 1997.
International Search Report from PCT Appl. No. PCT/US99/23452, 5 pages, mailed Jun. 4, 2000.
International Search Report from PCT Appl. No. PCT/US04/32440, 3 pages, mailed May 27, 2005.
Best, D.L. and Pryor, S.P., *Air Weather Service Model Output Statistics System Project Report*, United States Air Force, Entire Report submitted (Oct. 1983).
*Demand Modeling & Forecasting System Product Description*, Printed from Dialog File No. 256, 1 page (Apr. 1989—Product Release Data).
*Down to Earth Sales Analysis 3.1 Product Description*, Printed from Dialog File No. 256, 1 page (Apr. 1989—Product Release Date).
Hurrell, M., "The Weather Business," *Intercity*, pp. 29, 31 and 32 (Feb. 1991).
*IMREX Demand Forecasting System Product Description*, Printed from Dialog File No. 256, 1 page (1984—Product Release Date).
*The Weather Initiative*, (Brochure), The Met Office, 23 pages (1990).
*Microsoft Excel User's Guide*, Microsoft Corporation, pp. 280-281, 596-601 and 706-709 (1993).
Brennan Peter J., "Portfolio Managers Weather Global Risk Management Challenge," *Wall Street Computer Review*, Dealers Digest Inc., vol. 7, No. 1, pp. 20-22, 24, 54, 56, Oct. 1989.
Jensen, Cary and Anderson, Loy, *Harvard Graphics: The Complete Reference*, Osborne McGraw-Hill, pp. 5, 16, 17, 126-129 737-747, 1990.
Cave, Tom, "Weather Service Is a Boon to System Dispatchers," *Transmission & Distribution*, vol. 43, No. 8, pp. 165, 166, 168-169, Aug. 1991.
Mitchell et al., "Where No Computer Has Gone Before: Massively Parallel Processing Promises Unparalleled Performance," McGraw-Hill Inc., *Business Week*, pp. 80-84, 88, Nov. 25, 1991.
Engle, R.F. et al, "Modelling Peak Electricity Demand," John Wiley & Sons, Ltd., *Journal of Forecasting*, vol. 11, No. 3, pp. 241-251, Apr. 1992.
*Microsoft Access™ User's Guide*, Microsoft Corporation, pp. 22-27, 36-39, 327-335, 370-373, 395-447, 1992.
Ehrenberg, A.S.C. et al., "The After Effects of Price-Related Consumer Promotions," Advertising Research Foundation, Inc., *Journal of Advertising Research*, vol. 34, No. 4, pp. 11-12, Jul./Aug. 1994.
Patent Abstracts of Japan, JP 1236396, published Sep. 21, 1989.
Patent Abstracts of Japan, JP 1259488, published Oct. 17, 1989.
Patent Abstracts of Japan, JP 2268396, published Nov. 2, 1990.
Patent Abstracts of Japan, JP 2299059, published Dec. 11, 1990.
Patent Abstracts of Japan, JP 4077896, published Mar. 11, 1992.
Patent Abstracts of Japan, JP 4135271, published May 8, 1992.
Patent Abstracts of Japan, JP 4353970, published Dec. 8, 1992.
Patent Abstracts of Japan, JP 5189406, published Jul. 30, 1993.
Patent Abstracts of Japan, JP 6076161, published Mar. 18, 1994.
Patent Abstracts of Japan, JP 6149833, published May 31, 1994.
"SpaceRef.com", Space Shuttle Weather Launch Commit Criteria and KSC End of Mission Weather Landing Criteria, Jan. 29, 2000; 9 pages.
Chen, P.C., "Supercomputer-Based Visualization Systems Used for Analyzing Output Data of a Numerical Weather Prediction Model," ACM, pp. 296-309 (1990).
Riordan, D. and Hansen, B.K., "A fuzzy case-based system for weather prediction," *Engineering Intelligent Systems*, vol. 10, No. 3, CRL Publishing Ltd., pp. 139-146 (Sep. 2002).
English Abstract Page for Japanese Patent Publication No. 10096790, 1 page, data supplied from the esp@cenet database.
English Abstract Page for Japanese Patent Publication No. 11258359, 1 page, data supplied from the esp@cenet database.
Fox, Frederic, Weather—The next retail frontier, Discount Merchandiser, Oct. 1993, vol. 33, No. 10.
Robins, Gary, Tracking sales climate, Stores, Nov. 1993, vol. 75, No. 11, pp. 52-54.

Vogelstein, Fred, Corporate America loves the weather: why companies pay for next years forecast, U.S. News & World Report, Apr. 13, 1998, vol. 124, No. 14.
Cawthorn, Chris, Weather as a strategic element in demand chain planning, Journal of Business Forecasting Methods & Systems, Fall 1998, vol. 17, No. 3.
Baker, Stacy, Only the weatherman knows (but so can you), Apparel Industry Magazine, Jun. 1999, vol. 60, No. 6, pp. 16-18.
Planalytics Introduces Three Planning Products at Retail Systems 2001, PR Newswire, Jun. 5, 2001.
Demantra, Planalytics Offer Joint Solution, Business Wire, Aug. 20, 2001.
Taming Weather's Unpredictable Impact, Retail Merchandiser, Apr. 2002, vol. 42, No. 4.
Retailers use sales forecasts to get in front of the weather, National Home Center News, Nov. 20, 2000, vol. 26, No. 21, p. 8.
Leung, K.S. et al., Fuzzy Concepts in Expert Systems, IEEE, Sep. 1988.
Prior, John, Weather Intelligence: the new secret service, Food Manufacture, vol. 69, No. 5, May 1994.
Cawthorn, Chris, Weather As a Strategic Element in Demand Chain Planning, The Journal of Business Forecasting Methods & Systems, vol. 17, No. 3, Fall 1998.
Shutovich, Christina, When it rains, wipers pour profits: Retailers need to prepare for customers during a downpour, Aftermarket Business, vol. 109, No. 12, Dec. 1999.
Cawthorn, Christopher, Sunny today, sales tomorrow—clothing industry, Bobbin, May 1999.
McNeeley, Trent, High-tech weather service aids business planning, TechRepublic.com, Jan. 20, 2000.
Vilano, Matt, A Smile Makes a Lousy Umbrella, CIO Magazine, Mar. 15, 2000.
Impact SR from Planalytics Gives Retailers New Weapon Against Weather, PR NewsWire, Sep. 14, 2000.
Taming Weather's Unpredictable Impact, Retail Merchandiser, vol. 42, No. 4, Apr. 2002.
Weather for sale, Daily Record, Jun. 22, 2002.
Corby, Paul M., Weather volatility and power demand, Power Economics, vol. 6, No. 7, Jul./Aug. 2002.
SmartCorp.com Web Pages, Smart Software, Inc., May 2000-Jul. 2001. Retrieved from Archive.org, Dec. 20, 2005.
Lucas, Peter, Certainty-Factor-Like Structures in Bayesian Networks, Advances in Artificial Intelligence, AI*IA99, 1999.
Makridakis, Spyros et al., Forecasting Methods and Applications-Third Edition, John Wiley & Sons, 1998, ISBN: 0-471-53233-9.
Shim, Jae K., Strategic Business Forecasting—Revised Edition, CRC Press. 2000, ISBN: 1-57444251-1.
American Academy of Actuaries Index Securitization Task Force With Research and Input From Casualty Actuarial Society Valuation, Finance and Investments Committee, "Evaluating the Effectiveness of Index-Based Insurance Derivatives in Hedging Property/Casualty Insurance Transactions," American Academy of Actuaries, Oct. 4, 1999, as printed at http://www.casact.org/research/istf/istf.pdf.
Zeng, L., "Pricing Weather Derivatives," *Journal of Risk Finance*, Spring 2000, as printed at http://www.atmos.washington.edu/~lixin/Zeng2000.pdf, pp. 72-78.
International Search Report issued Sep. 14, 2007 for PCT/US06/24563, 8 pages.
World's First Financial Weather Index Acquired by Weather Board of Trade, PR Newswire. New York: Apr 16, 2002. p. 1.
Ex parte Bilski, No. 2002-2257, 2006 Pat. App. Lexis 51, at *1 n. 1 (B.P.A.I. Sep. 26, 2006).
In re Bilski, No. 2007-1130 (Fed. Cir. Feb. 15, 2008).
Carl G. Anderson, "Complex Market Policy Mix Indicates Volatile Prices," vol. 12, No. 8, May 16, 2005, pp. 1 and 2.
Carl G. Anderson, "Complex Market Policy Mix Indicates Volatile Prices," vol. 12, No. 8, May 16, 2005, Graph, p. 1.
Supplementary International Search Report for European Appln. No. 9790 3932 completed Jul. 12, 2001, 2 pgs.
Office Action for Canadian Appln. No. 2,243,861, mailed Sep. 26, 2006, 5 pgs.

* cited by examiner

| Year | MA | Data Type | P1 | P2 | P3 |
|---|---|---|---|---|---|
| 2000 | MSA 100 | TEMP | 49.0 | 43.0 | 45.0 |
| 2000 | MSA 100 | PREC | 1.5 | 0.4 | 0.9 |
| 2000 | MSA 100 | SNOW | 0.0 | 0.0 | 0.0 |
| 2000 | MSA 100 | TEMP.CAT | 1.0 | -1.0 | -1.0 |
| 2000 | MSA 100 | PREC.CAT | 1.0 | -1.0 | -1.0 |
| 2000 | MSA 100 | CT MAX WARM | 4.0 | 1.0 | 2.0 |
| 2000 | MSA 100 | CT MIN SEAS | 1.0 | 1.0 | 4.0 |
| 2000 | MSA 100 | CT MAX WARM DRY | 0.0 | 2.0 | 1.0 |
| 2000 | MSA 100 | CT MIN COLD WET | 1.0 | 0.0 | 0.0 |
| 2000 | MSA 100 | CT MIN WARM MINUS COLD | 1.0 | -2.0 | 0.0 |
| 2000 | MSA 100 | CT MIN WARM SEAS MINUS COLD | 1.52 | 0.23 | 0.4 |
| 2000 | MSA 100 | CT MAX TEMP 32 AND PRECIP | 0.0 | 0.0 | 0.0 |
| 2001 | MSA 100 | TEMP | 53.0 | 51.0 | 56.0 |
| 2001 | MSA 100 | PREC | 1.1 | 0.01 | 2.68 |
| 2001 | MSA 100 | SNOW | 0.0 | 1.2 | 0.0 |
| 2001 | MSA 100 | TEMP.CAT | 1.0 | 1.0 | 1.0 |
| 2001 | MSA 100 | PREC.CAT | 1.0 | -1.0 | 1.0 |

| MA | Data Type | P1 | P2 | P3 |
|---|---|---|---|---|
| MSA 100 | TEMP.SEA | 46.0 | 47.0 | 50.0 |
| MSA 100 | PREC.SEA | 1.01 | 1.03 | 1.08 |
| MSA 100 | SNOW.SEA | 0.7 | 0.2 | 0.2 |

| MSA | YEAR | MONTH | TEMPERATURE | PRECIPITATION |
|---|---|---|---|---|
| UK002 | 2001 | APR | Warm | Showers |
| UK002 | 2001 | MAY | Seasonal | Rain |
| UK002 | 2001 | JUN | Warm | Dry |
| UK002 | 2001 | JUL | Very Warm | Showers |
| UK002 | 2001 | AUG | Cold | Rain |
| UK002 | 2000 | APR | Seasonal | Showers |
| UK002 | 2000 | MAY | Cold | Dry |
| UK002 | 2000 | JUN | Warm | Showers |
| UK002 | 2000 | JUL | Seasonal | Dry |
| UK002 | 2000 | AUG | Warm | Rain |

251, 252, 253, 254, 255, 256, 257, 258, 259, 260

250

| MSA | YEAR | TIMEFRAME | CT_MIN_SEAS | CT_MAX_COLD_WET |
|---|---|---|---|---|
| MSA 100 | 2001 | P1 | 2 | 0 |
| MSA 100 | 2001 | P2 | 6 | 6 |
| MSA 100 | 2001 | P3 | 4 | 6 |
| MSA 100 | 2001 | P4 | 5 | 1 |
| MSA 100 | 2001 | P5 | 2 | 5 |
| MSA 100 | 2000 | P1 | 1 | 6 |
| MSA 100 | 2000 | P2 | 1 | 6 |
| MSA 100 | 2000 | P3 | 4 | 6 |
| MSA 100 | 2000 | P4 | 3 | 5 |
| MSA 100 | 2000 | P5 | 4 | 4 |

| TEMPERATURE | | PRECIPITATION | | | |
|---|---|---|---|---|---|
| | | DRY | SHOWERS | RAIN | SNOW |
| | Very WARM | 2 | 2 | 1 | -2 |
| | WARM | 2 | 1 | 1 | -2 |
| | SEASONAL | 0 | 0 | -1 | -2 |
| | COLD | -1 | -1 | -2 | -2 |
| | Very COLD | -2 | -2 | -2 | -2 |

310

| PRODUCT | MSA | MATRIX | START | END |
|---|---|---|---|---|
| HVAC A/C units | UK002 | 310 | APR | AUG |
| HVAC Fans | UK002 | 310 | APR | AUG |
| AUTO A/C units | UK002 | 310 | MAY | AUG |
| Bottled Water/Beverages | UK002 | 310 | APR | AUG |
| HVAC A/C units | UK026 | 310 | APR | AUG |
| HVAC Fans | UK026 | 310 | APR | AUG |
| AUTO A/C units | UK026 | 310 | MAY | AUG |
| Bottled Water/Beverages | UK026 | 310 | APR | AUG |

| PRODUCT | MSA | TIMEFRAME | TEMP COEFFICIENT | PREC COEFFICIENT | MIN | MAX |
|---|---|---|---|---|---|---|
| Boots | MSA 100 | P1 | 0.0020 | 0.001 | 0.033 | 1.00 |
| Boots | MSA 100 | P2 | 0.0073 | -0.001 | 0.067 | 1.03 |
| Boots | MSA 100 | P3 | 0.0167 | 0.053 | 0.133 | 1.06 |
| Boots | MSA 100 | P4 | -0.0007 | 0.042 | 0.167 | 1.00 |
| Boots | MSA 100 | P5 | -0.0013 | 0.053 | 0.100 | 0.80 |

| MSA | SUB-LOCATION | WEIGHT |
|---|---|---|
| MSA 100 | ST1 | 1 |
| MSA 100 | ST2 | 1.2 |
| MSA 100 | ST3 | 1 |
| MSA 100 | ST4 | 0.95 |
| MSA 100 | ST5 | 1 |

711, 712, 713, 714, 715

720

| PRODUCT | TIMEFRAME | SUB-TIMEFRAME | WEIGHT |
|---|---|---|---|
| Boots | P1 | W1 | 0.25 |
| Boots | P1 | W2 | 0.35 |
| Boots | P1 | W3 | 0.2 |
| Boots | P1 | W4 | 0.2 |
| Boots | P2 | W5 | 0.3 |
| Boots | P2 | W6 | 0.25 |
| Boots | P2 | W7 | 0.25 |
| Boots | P2 | W8 | 0.3 |
| Boots | P4 | W13 | 0.2 |
| Boots | P4 | W14 | 0.2 |
| Boots | P4 | W15 | 0.4 |
| Boots | P4 | W16 | 0.25 |

SYSTEM, METHOD, AND COMPUTER PROGRAM PRODUCT FOR FORECASTING WEATHER-BASED DEMAND USING PROXY DATA

CROSS-REFERENCE TO RELATED APPLICATIONS

This application is a continuation-in-part of U.S. application Ser. No. 09/656,397, filed Sep. 6, 2000 now U.S. Pat. No. 7,069,232, which is a continuation-in-part of U.S. application Ser. No. 09/097,714, filed Jun. 16, 1998 now U.S. Pat. No. 7,103,560, which is a continuation of U.S. application Ser. No. 08/588,248, filed Jan. 18, 1996, now U.S. Pat. No. 5,832,456, each of which is incorporated herein in its entirety by reference.

The following applications of common assignee are related to the present application and each is incorporated herein in its entirety by reference:

"System and Method for the Advanced Prediction of Weather Impact on Managerial Planning Applications," U.S. application Ser. No. 08/002,847, filed Jan. 15, 1993, now U.S. Pat. No. 5,521,813.

"System and Method for Determining the Impact of Weather and Other Factors on Managerial Planning Applications," U.S. application Ser. No. 08/205,494, filed Mar. 4, 1994, now U.S. Pat. No. 5,491,629.

"A User Interface For Graphically Displaying the Impact of Weather on Managerial Planning," U.S. application Ser. No. 08/504,952, filed Jul. 20, 1995, now U.S. Pat. No. 5,796,932.

BACKGROUND OF THE INVENTION

1. Field of the Invention

The present invention relates to forecasting weather-based demand for a product for an entity without a need for the entity to develop sales history data for the product.

2. Background Art

Historical Perspective of Retailing

The retail industry has historically been influenced by the shape of the times. For example, the retail industry is impacted by war and peace, lifestyle changes, demographic shifts, attitude progressions, economic expansion and contraction, tax policies, and currency fluctuations.

The period from 1965 to 1975 was marked by growth and segmentation in the retail industry. New types of stores such as department stores, specialty stores, and discount stores appeared, increasing competition in the retail industry. One result of this growth was a decrease in gross margin (sales price—cost of goods sold). Another result was a shifting of supply sources. Originally, merchandise was supplied exclusively by vendors. However, segmentation and growth resulted in specialty chains and discounters manufacturing merchandise in-house (commonly known as vertical integration).

The period from 1975 to 1980 was marked by disillusionment and complexity in the retail industry. Inflation and women entering the work force in significant numbers resulted in a more sophisticated consumer. Many retailers began to rethink the basics of merchandising in terms of merchandise assortments, store presentations, customer service, and store locations. Other less sophisticated retailers continued on an undisciplined and unstructured policy of store growth.

The period from 1980 to 1990 was marked by recovery and opportunity in the retail industry. An economic boom stimulated consumer confidence and demand. This, coupled with the expansion of the previous period, paved the way for the retail industry to overborrow and overbuild. With their increased size, retailers became increasingly unable to manage and analyze the information flowing into their organizations.

Retailing Problems and the Evolution of Computing Systems

The problems and opportunities facing the retailer fall into two categories of factors: (1) external factors and (2) internal (or industry) factors. External factors impacting the retail industry include, for example, adverse or favorable weather, rising labor costs, increasing property costs, increased competition, economics, increasing cost of capital, increasing consumer awareness, increasing distribution costs, changing demographics and zero population growth, decreasing labor pool, and flat to diminishing per capita income.

Internal (or industry) factors affecting the retail industry include, for example, large number of stores (decentralization), homogeneity among retailers, continuous price promotion (equates to decreased gross margin), decreasing customer loyalty, minimal customer service, physical growth limitations, and large quantities of specific retailer store information.

Growth and profitability can only be achieved by maximizing the productivity and profitability of the primary assets of the retail business: merchandise (inventory), people, and retail space. The above external and industry factors have added to a retailer's burdens of maintaining the productivity of these assets.

Of the three primary assets, merchandise productivity is particularly important due to the limiting effect of external and internal factors on people and space productivity (e.g., physical growth limitations and high labor costs). Merchandise productivity can be best achieved by maintaining effective mix of product in a store by product characteristic (merchandise assortments).

To achieve more effective merchandise assortments, a retailer must have a merchandise plan that provides the retailer with the ability to (1) define, source, acquire, and achieve specific target merchandise assortments for each individual store location; (2) achieve an efficient, non-disruptive flow from supply source to store; (3) maintain store assortments which achieve anticipated financial objectives; and (4) communicate effectively across all areas of the business to facilitate coordinated action and reaction.

Such an effective merchandise plan must consider all possible external and industry factors. To obtain this knowledge, a retailer must have responsive and easy access to the data associated with these factors, referred to as external and industry data, respectively. To assimilate and analyze this data, which comes from many sources and in many formats, retailers began utilizing management information systems (MIS). The primary function of the MIS department in the retail industry has been the electronic collection, storage, retrieval, and manipulation of store information. Mainframe-based systems were primarily utilized due to the large amount of store information generated. Store information includes any recordable event, such as purchasing, receiving, allocation, distribution, customer returns, merchandise transfers, merchandise markdowns, promotional markdowns, advertising, inventory, store traffic, and labor data. In contrast to the extensive collection and storage of internal data, these systems did not typically process external data. Rather, this non-industry data was simply gathered and provided to the retailer for personal interpretation.

Since understanding of local and region level dynamics is a requisite for increased retailing productivity, retailers would essentially feed store information at the store level into massive mainframe databases for subsequent analysis to identify basic trends. However, the use of mainframes typically requires the expense of a large MIS department to process data requests. There is also an inherent delay from the time of a data request to the time of the actual execution. This structure prevented MIS systems from becoming cost effective for use by executives in making daily decisions, who are typically not computer specialists and thus rely on data requests to MIS specialists.

In the 1970s and 1980s, retrieval of store information for analysis and subsequent report generation were manually or electronically generated through a custom request to MIS department personnel. More recently, in response to the need for a rapid executive interface to data for managerial plan preparation, a large industry developed in Executive Information Systems (EIS). An EIS system is a computer-based system, which typically operates on a personal computer workstation platform and interfaces with the MIS mainframe or mid-range database. EIS systems generally allows information and analysis can be accessed, created, packaged and/or delivered for use on demand by users who are non-technical in background. Also, EIS systems perform specific managerial applications without extensive interaction with the user, which reduces or eliminates the need for computer software training and documentation.

In contrast to store information, external information consists of manual reports covering such topics as economic forecasts, demographic changes, and competitive analysis. In conventional systems, external information is separately made available to the user for consideration in developing managerial plan.

Technical improvements in speed and storage capability of personal computers (PCs) have allowed this trend towards EIS systems to take place, while most firms still maintain a mainframe or minicomputer architecture for basic point of sale (POS) data storage and processing. The advent of powerful mini computers, local area networks (LANs), and PC systems has resulted in many of the traditional mainframe retailing applications migrating to these new platforms.

Weather and Planning Activities

Weather anomalies are more of a regional and local event rather than a national phenomenon in countries as geographically large as the United States. This is not to say that very anomalous weather cannot affect an entire country or continent, creating, for example, abnormally hot or cold seasons. However, these events are less frequent than regional or local aberrations. Significant precipitation and temperature deviations from normal events occur continually at time intervals in specific regions and locations throughout the United States.

Because actual daily occurrences fluctuate around the long term "normal" or "average" trend line (in meteorology, normal is typically based on a 30 year average), past historical averages can be a very poor predictor of future weather on a given day and time at any specific location. Implicitly, weather effects are already embedded in an MIS POS database, so the retailer is consciously or unconsciously using some type of historical weather as a factor in any planning approach that uses trendline forecasts based on historical POS data for a given location and time period.

At a national level, weather is only one of several important variables driving consumer demand for a retailer's products. Several other factors are, for example, price, competition, quality, advertising exposure, and the structure of the retailer's operations (number of stores, square footage, locations, etc). Relative to the national and regional implementation of planning, the impact of all of these variables dominates trendline projections.

As described above, POS databases track sales trends of specific categories at specific locations which are then aggregated and manipulated into regional and national executive information reports. Since the impact of local weather anomalies can be diluted when aggregated to the national levels (sharp local sales fluctuations due to weather tend to average out when aggregated into national numbers), the impact of weather has not received much scrutiny relative to national planning and forecasting.

The impact of weather on a regional and local level is direct and dramatic. At the store level, weather is often a key driver of sales of specific product categories. Weather also influences store traffic which, in turn, often impacts sales of all goods. Weather can influence the timing and intensity of markdowns, and can create stockout situations which replenishment cycles can not address due to the inherent time lag of many replenishment approaches.

The combination of lost sales due to stockouts and markdowns required to move slow inventory are enormous hidden costs, both in terms of lost income and opportunity costs. Aggregate these costs on a national level, and weather is one of the last major areas of retailing where costs can be carved out (eliminate overstocks) and stores can improve productivity (less markdown allows for more margin within the same square footage).

In short, weather can create windows of opportunity or potential pitfalls that are completely independent events relative to economics, demographics, consumer income, and competitive issues (price, quality). The cash and opportunity costs in the aggregate are enormous.

Conventional Approaches Addressing Weather Impact

Though the majority of retailers acknowledge the effects of weather, many do not consider weather as a problem per se, considering it as a completely uncontrollable part of the external environment.

However, the underlying problem is essentially one of prediction of the future; i.e., developing a predictive model. All retailers must forecast (informally or formally) how much inventory to buy and distribute based on expected demand and appropriate inventory buffers. Hence, many conventional predictive modeling processes have been developed, none of which adequately address the impact of weather.

One conventional solution is to purposely not consider the impact of weather on retail sales. In such instances, the retailer will maintain high inventory levels and rapidly replenish the inventory as it is sold. This approach creates large working capital needs to support such a large inventory.

Another conventional solution is for the retailer to qualitatively use weather information to anticipate future demands. This procedure, if used by decision makers, is very subjective and does not evaluate weather in a predictive sense. Nor does it quantify the effect of past and future weather on consumer demands.

Another conventional approach is the utilization of climatology. Climatology is the study of the climates found on the earth. Climatology synthesizes weather elements (temperature, precipitation, wind, etc.) over a long period of time (years), resulting in characteristic weather patterns for a given area for a given time frame (weekly, monthly, seasonably, etc.). This approach does not utilize forecasted weather as a parameter, which can vary considerably from any given time period from year to year for a given area. Climatology yields only the average weather condition, and is not indicative of the weather for any specific future time frame.

Manufacturers and retailers have been known to rely on broad projections developed by the National Weather Service (the governmental entity in the USA charged with disseminating weather data to the public) and other private forecasting firms. With reference to long range projections, these may be vague, broad, and lack regional or local specificity. It is of limited use since they are issued to cover anticipated weather averaged for 30, 60, or 90 day periods covering large geographic areas. This information cannot be quantified or easily integrated into an MIS-based planning system which is geared toward a daily or weekly time increment for specific location and time.

In summary, the above conventional solutions to weather planning problems in retail all suffer from one or several deficiencies which severely limit their commercial value, by not providing: (1) regional and/or local specificity in measuring past weather impact and projecting future weather impact, (2) the daily, weekly, and monthly increment of planning and forecasting required in the retail industry, (3) ample forecast leadtime required by such planning applications as buying, advertising, promotion, distribution, financial budgeting, labor scheduling, and store traffic analysis, (4) the quantification of weather impact required for precise planning applications such as unit buying and unit distribution, financial budget forecasting, and labor scheduling, (5) reliability beyond a three to five day leadtime, (6) a predictive weather impact model, which links quantitative weather impact measurement through historical correlation, with quantitative forecasts, (7) the ability to remove historical weather effects from past retail sales for use as a baseline in sales forecasting, (8) an entirely electronic, computerized, EIS implementation for ease of data retrieval/analysis with specific functions that solve specific managerial planning applications, and (9) a graphical user interface representing a predictive model in graphs, formats, and charts immediately useful to the specific managerial applications.

Today's Additional Needs

The above-identified nine limitations of conventional solutions to weather planning problems in retail were met by such systems, methods and computer program products disclosed in commonly-assigned U.S. Pat. Nos. 5,521,813; 5,491,629; 5,796,932; and 5,832,456; and commonly-assigned U.S. application Ser. Nos. 09/656,397; and 09/907,714, each of which is incorporated herein in its entirety by reference. However, what is currently needed is a system, method, or computer program product that can forecast weather-based demand for a product for an entity without a need for the entity to develop sales history data for the product.

Scope of the Problem

While the above discussion focused on the retail industry (i.e., the impact of weather on the retail industry), the effects of weather are not confined to the retail industry. Weather impacts many aspects of human endeavor. Accordingly, the discussion above applies equally to many other applications, including but not limited to, retail products and services; manufacturing/production (e.g., construction, utilities, movie production companies, advertising agencies, forestry, mining, and the like); transportation; the entertainment industry; the restaurant industry; consumer activities and/or events (e.g., golfing, skiing, fishing, boating, vacations, family reunions, weddings, honeymoons, and the like); and processing, valuating, and trading of financial instruments (e.g., options, futures, swaps, and the like).

BRIEF SUMMARY OF THE INVENTION

The present invention comprises a system, method, and computer program product that can forecast weather-based demand for a product for an entity without a need for the entity to develop sales history data for the product.

In an embodiment, the present invention comprises a system for forecasting weather-based demand. The system comprises a recombination processor. The recombination processor is configured to receive weather metric data and a weather factor relationship knowledgebase. The recombination processor is configured to produce normalized weather factor metric data. The weather factor relationship knowledgebase can be a weather-impact model. The weather-impact model can comprise at least one of an empirical scoring matrix, a weather indices template, and a proxy model conditions template. The weather-impact model can be derived from an analysis of normalized proxy sales history data.

The normalized proxy sales history data can be derived from at least one of old sales history data for a product from an entity, sales history data for the product from a second entity, sales history data for the product from an outside source, sales history data for a category that includes the product, and sales history data for a proxy product that has a similar weather-based demand relationship as the product.

The system can further comprise a volatility scaling processor. The volatility scaling processor can be configured to receive the normalized weather factor metric data and volatility scale factor data. The volatility scaling processor can be configured to produce scaled weather factor metric data. The system can also further comprise a deaggregation processor. The deaggregation processor can be configured to receive the normalized or the scaled weather factor metric data and deaggregation data. The deaggregation processor can be configured to produce deaggregated weather factor metric data.

In another embodiment, the present invention comprises a method for forecasting weather-based demand. Weather metrics data and a weather factor relationship knowledgebase are received and used to forecast the weather-based demand. The weather factor relationship knowledgebase can be a weather-impact model. The weather-impact model can comprise at least one of an empirical scoring matrix, a weather indices template, and a proxy model conditions template. The weather-impact model can be derived from an analysis of normalized proxy sales history data. The weather-based demand can be scaled, deaggregated, or both.

In yet another embodiment, the present invention comprises a computer program product for forecasting weather-based demand. The computer program product has computer program code means embodied in a computer useable medium. The computer program code means comprises a first program code means, a second program code means, and a third program code means. The first program code means are for receiving weather metrics data. The second program code means are for receiving a weather factor relationship knowledgebase. The third program code means are for forecasting the weather-based demand by using the weather metrics data and the weather factor relationship knowledgebase.

The weather factor relationship knowledgebase can be a weather-impact model. The weather-impact model can comprise at least one of an empirical scoring matrix, a weather indices template, and a proxy model conditions template. The weather-impact model can be derived from an analysis of normalized proxy sales history data.

The computer program product can further comprise a fourth program code means. The fourth program code means can be for scaling the weather-based demand, for deaggregating the weather-based demand, or both.

Further embodiments, features, and advantages of the present invention, as well as the structure and operation of the various embodiments of the present invention, are described in detail below with reference to the accompanying figures.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

FIGS. 2A and 2B show an exemplary representation of weather metric data 108.

FIG. 3 shows weather factor relationship knowledgebase 110 with an exemplary empirical scoring matrix 310.

FIG. 5 shows weather factor relationship knowledgebase 110 with an exemplary proxy model conditions template 500.

FIG. 7 shows an exemplary representation of deaggregation data 116.

Figure 1:
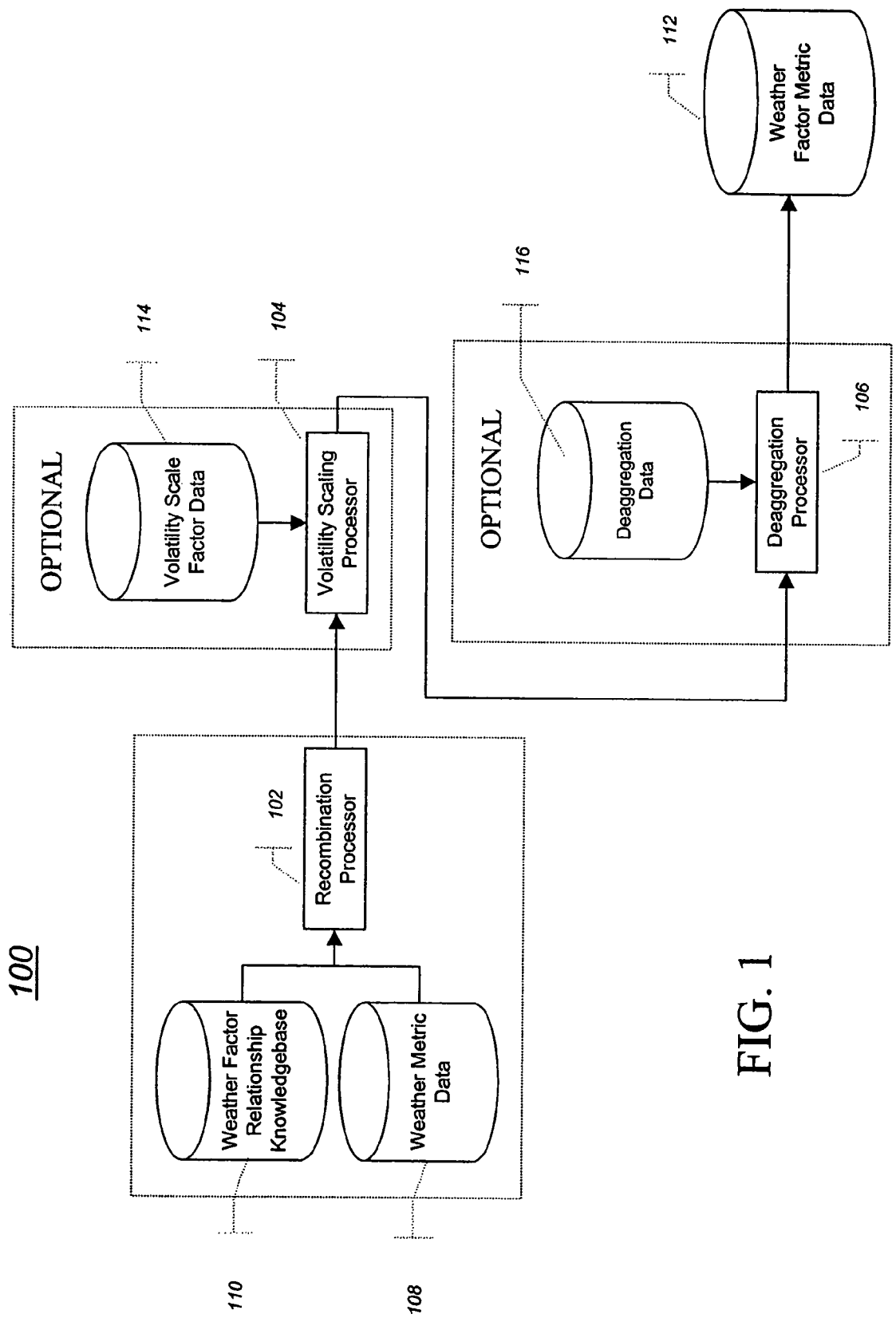
FIG. 1 is a block diagram of a system 100 for forecasting weather-based demand.

The preferred embodiments of the invention are described with reference to the figures where like reference numbers indicate identical or functionally similar elements. Also in the figures, the left-most digit(s) of each reference number identify the figure in which the reference number is first used.

DETAILED DESCRIPTION OF THE INVENTION

Overview

For convenience, the present invention is described herein in the context of a retail environment. However, it should be understood that the invention is adapted and envisioned for use in many other applications, including but not limited to, retail products and services; manufacturing/production (e.g., construction, utilities, movie production companies, advertising agencies, forestry, mining, and the like); transportation; the entertainment industry; the restaurant industry; consumer activities and/or events (e.g., golfing, skiing, fishing, boating, vacations, family reunions, weddings, honeymoons, and the like); and processing, valuating, and trading of financial instruments (e.g., options, futures, swaps, and the like). Thus, as used herein, the term "product" refers to the interest of any of the applications described above. Furthermore, the present invention is described in terms of data that corresponds to a specific location, a specific year, a specific time period, or any combination of the foregoing. The skilled artisan will understand that the present invention functions even when data is not specifically delineated by location, year, or time period. Thus, the present invention is not limited by data delineated in this manner.

The present invention comprises a system, method, and computer program product that can forecast weather-based demand for a product for an entity without a need for the entity to develop sales history data for the product. The present invention has particular applications for entities lacking sales history data for a product (e.g., manufacturers), for entities planning expansion of the geographical scope of their business, and for entities considering additional product offerings. The skilled artisan will recognize other applications for the present invention such that the present invention is not limited to the applications described above.

In the present invention, the methods for forecasting weather-based demand for a product use weather metric data and a weather factor relationship knowledgebase. The weather metric data can comprise a variety of denominations for weather conditions, weather patterns, or both. The weather conditions or weather patterns can be determined from recorded observations, forecasts, or both. The weather factor relationship knowledgebase can be realized by any of a variety of weather-impact models. A weather-impact model describes an effect that weather has had (or is expected to have) on demand for a specific product at a specific location during a specific time period. The effect is derived from an analysis of normalized proxy sales history data for the specific product using statistical techniques, expert assessment, expert definition, or any combination of the foregoing.

In addition to various stand-alone embodiments, the present invention can also be used in conjunction with the methods described in commonly-assigned U.S. Pat. Nos. 5,521,813; 5,491,629; 5,796,932; and 5,832,456; commonly-assigned U.S. application Ser. Nos. 09/656,397; and 09/907,714; and similar methods. That is to say, additional information with regards to weather-based demand for a product may be derived by comparing a forecast of weather-based demand for the product determined using the methods described herein (which use proxy sales history data for the product) with a forecast of weather-based demand for the product determined using any of the methods in commonly-assigned U.S. Pat. Nos. 5,521,813; 5,491,629; 5,796,932; and 5,832,456; and commonly-assigned U.S. application Ser. Nos. 09/656,397; and 09/907,714 (which use actual sales history data for the product).

For example, actual sales history data for the product inherently include the effects of a variety of factors that impact demand for the product. Such factors include, in addition to weather conditions and weather patterns, such activities as advertising, promotional markdowns, management practices of the entity, and the like. Therefore, a forecast of weather-based demand for the product determined using actual sales history data may not accurately depict the effect of weather on demand for the product. However, a comparison of this forecast with a second forecast determined using proxy sales history data can be used to extract the effect of weather on demand for the product from the effect of other factors that impact demand (e.g., advertising, promotional markdowns, etc.). The skilled artisan will appreciate other advantages to forecasting weather-based demand for a product for an entity using data that is independent of the management practices of the entity.

System for Forecasting Weather-Based Demand

The present invention provides a system for forecasting weather-based demand. FIG. 1 is a block diagram of a system 100 for forecasting weather-based demand. System 100 comprises a recombination processor 102, optionally a volatility scaling processor 104, and optionally a deaggregation processor 106. Recombination processor 102 can receive input data from weather metric data 108 and weather factor relationship knowledgebase 110 and can produce normalized weather factor metric data 112. Normalized weather factor metric data 112 can be indicative of weather-based demand. Optionally, normalized weather factor metric data 112 can be refined via a volatility scaling processor 104 that uses volatility scale factor data 114 to scale normalized weather factor metric data 112. Optionally, normalized weather factor metric data 112 (scaled or otherwise) can be refined via a deaggregation processor 106 that uses deaggregation data 116. System 100 allows an entity to forecast weather-based demand for a specific product/location/time period combination using weather metric data 108 and weather factor relationship knowledgebase 110.

Weather Metric Data

FIGS. 2A and 2B show an exemplary representation of weather metric data 108. Weather metric data 108 can comprise any of a variety of tables including, but not limited to: Table 210, Table 230, Table 250, and Table 270. Weather metric data 108 can comprise a variety of denominations for weather conditions, weather patterns, or both. The weather conditions or weather patterns can be determined from recorded observations, forecasts, or both. The weather information of weather metric data 108 can be provided on a per period basis (e.g., P1, P2, P3, etc.). The period can be any increment of time, such as daily, weekly, bi-weekly, monthly, bimonthly, quarterly, etc. Preferably, the time period used for weather metric data 108 corresponds to a time period used for weather factor metric output data 112.

Weather metric data 108 can be received from a variety of public and nonpublic sources. These include, but are not limited to, Planalytics, Inc. of Wayne, Pa., U.S.A.; Weather-Markets.com of Wayne, Pa., U.S.A.; Agricultural Weather Information Service, Inc. of Auburn, Ala., U.S.A.; the National Climatic Data Center; the National Weather Service; the Federal Aviation Administration; the United States Coast Guard; and the military services. Weather metric data 108 can include information on the weather at specific times, specific locations, or both. For example, weather metric data 108 can include one or more records (shown as rows) identified by a specific year, a specific metropolitan area (MA), or both. (The term MA closely resembles the term Metropolitan Statistical Area (MSA), which is well known to those of skill in the art. However, a MA encompasses a larger surrounding geographical area/region than does a corresponding MSA, strictly defined. Nevertheless, since MA and MSA are similar, they are used interchangeably herein.) For example, weather metric data 108 can contain, but is not limited to, information for 600 MAs.

Records of weather metric data 108 can be further identified by different weather data types. In an embodiment of the present invention, weather metric data 108 can include four types of weather data: actual, seasonal, category, and index. These records can contain fields of data specifying the weather that occurred or is forecast for a specific year, in a specific MA, of a specific weather data type for one or more of the periods.

An actual weather data type is used for the actual value of a weather condition. For example, the weather data type "temp" is used for the actual temperature. The weather data type "snow" is used for the actual snowfall. The weather data type "prec" is used for the actual precipitation. In Table 210, records 211, 212, 213, 223, 224, and 225 include examples of actual weather data.

A seasonal weather data type is used for the seasonal (or arithmetic average) value of a weather condition. For example, the weather data type "temp.sea" is used for the average (or seasonal) temperature. The weather data type "snow.sea" is used for the average snowfall. The weather data type "prec.sea" is used for the average precipitation. In Table 230, records 231, 232, and 233 include examples of seasonal weather data. Note that, because seasonal weather data is not associated with specific years, records in Table 230 are not identified by specific years.

A category weather data type can be used to reflect a relationship between actual and seasonal values of a weather condition. For example, the weather data type "temp.cat" can be used to reflect a relationship between actual and seasonal temperature. The weather data type "prec.cat" can be used to reflect a relationship between actual and seasonal precipitation. The relationship can be represented by numeric data. For example, for a specific category weather data type record and a specific period: (1) if the data has a value of 1, then the actual value of the specific weather condition was (or is forecasted to be) greater than its seasonal value; (2) if the data has a value of 0, then the actual value of the specific weather condition was (or is forecasted to be) substantially equal to its seasonal value; and (3) if the data has a value of −1, then the actual value of the specific weather condition was (or is forecast to be) less than its seasonal value. In Table 210, records 214, 215, 226, and 227 include examples of category weather data as described above.

Of course, values other than 1, 0, and −1 could be alternatively used to indicate these relationships. For example, commonly assigned pending U.S. application Ser. No. 09/656,397, filed Sep. 6, 2000, which is incorporated herein in its entirety by reference further differentiates temperature conditions as "very cold", "cold", "seasonal", "warm", and "very warm". As used in U.S. application Ser. No. 09/656,397, these categories are defined below:

Very Cold: The top ten percent coldest days that have historically occurred over a 30 year period from, for example, 1961-1990 based on a historical frequency distribution for a given location at a specific time period.

Cold: Colder than seasonal for a particular location and time based on historical frequency distribution curves. That is, "cold" can occur in July when, for example, it is 79° F. in Philadelphia when 85° F. is "seasonal" or normal weather. This is because the perception to people in the Philadelphia geographic region is the day is not a typical July day, and thus "cold".

Seasonal: In keeping with, or appropriate to, the time or season; timely; about normal or routine for the time of the year for a given location at a specific time (daily, weekly, monthly, yearly, etc.).

Warm: Temperatures that are above the seasonal (normal) range for a given location at a specific period of time.

Very Warm: The top ten percent warmest days that have historically occurred over a 30 year period from, for example, 1961-1990 based on a historical frequency distribution for a given location at a specific time period given location, then index weather data types can be defined to identify these combinations. The following are examples of such index weather data types:

CT_MAX_WARM: The count of days within a period having the daily maximum temperature above seasonal.

CT_MIN_SEAS: The count of days within a period having the daily minimum temperature at (or about) seasonal.

CT_MAX_WARM_DRY: The count of days within a period having both the daily maximum temperature above seasonal and dry conditions.

CT_MIN_COLD_WET: The count of days within a period having both the daily minimum temperature below seasonal and wet conditions.

CT_MIN_WARM_MINUS_COLD: The difference between the count of days within a period having the daily minimum temperature above seasonal and the count of days having the daily minimum temperature below seasonal.

CT_MAX_WARM_SEAS_MINUS_COLD: Within a period, the difference between the following two quantities: (1) the sum of the count of days having the daily maximum temperature above seasonal and four-tenths of the count of days having the daily maximum temperature at (or about) seasonal and (2) the count of days having the daily maximum temperature below seasonal.

CT_MAX_TEMP_32_AND_PRECIP: The count of days within a period having both the daily maximum temperature below or equal to thirty-two degrees Fahrenheit and some form of precipitation.

In Table 210, records 216, 217, 218, 219, 220, 221, 222, and in Table 270, records 271, 272, 273, 274, 275, 276, 277, 278, 279, and 280 include examples of index weather data as described above. The skilled artisan will appreciate other ways in which index weather data types can be derived. The present invention is not limited to the index weather data types described above.

Weather Factor Relationship Knowledgebase

Weather factor relationship knowledgebase 110 can be realized by a weather-impact model. The weather-impact model describes an effect that weather has had (or is expected to have) on demand for a specific product at a specific location during a specific time period. The effect is derived from an analysis of normalized proxy sales history data for the specific product using statistical techniques, expert assessment, expert definition, or any combination of the foregoing. Thus, advantageously, an entity does not need to develop sales history data for the specific product at the specific location during the specific time period.

Proxy sales history data can be derived from any of a variety of sources. These include, but are not limited to: (1) old sales history data for the specific product from the entity, (2) sales history data for the specific product from a second entity, (3) sales history data for the specific product from an outside source, (4) sales history data for a category (e.g., FOOTWEAR) that includes the specific product (e.g., BOOTS), (5) sales history data for a proxy product (e.g., HATS) that has a similar weather-based demand relationship as the specific product (e.g., BOOTS), and (6) any combination of the foregoing (e.g., sales history data for a category that includes a proxy product with a similar weather-based demand relationship as the specific product from an outside source that is several years old). Outside sources can include, but are not limited to, reports produced by ACNielsen of New York, N.Y., U.S.A.; The D&B Corporation of Short Hills, N.J., U.S.A. (Dun and Bradstreet); and the like. A proxy product or a category can be determined using statistical techniques, expert assessment, expert definition, or any combination of the foregoing.

Proxy sales history data for the specific product are normalized using any technique that ensures consistent scale between data from different sources. For example, proxy sales history data for the specific product can be normalized with respect to total sales within a combination of a specific location and a specific time period. Preferably, the desired weather-based demand is for a location similar to the location from which normalized proxy sales history data was derived. Preferably, the desired weather-based demand is for a time period similar to the time period from which normalized proxy sales history data was derived. Preferably, normalized proxy sales history data comprises a large volume of data, data for recent sales, or both.

Weather factor relationship knowledgebase 110 can be realized in a variety of forms. Often, a form for weather factor relationship knowledgebase 110 can depend upon the availability of the data from which the weather-impact model was derived. Generally, but not always, a form derived from actual weather data is preferable to other forms, and a form derived from index weather data is preferable to one derived from category weather data.

Exemplary forms for weather factor relationship knowledgebase 110 are described below as three different embodiments of the present invention. However, the skilled artisan will recognize other forms for weather factor relationship knowledgebase 110. The present invention is not limited to the forms described below.

Empirical Scoring Matrices

In a first embodiment, weather factor relationship knowledgebase 110 comprises at least one empirical scoring matrix. FIG. 3 shows weather factor relationship knowledgebase 110 with an exemplary empirical scoring matrix 310. Scoring matrix 310 is described in U.S. application Ser. No. 09/656,397, which is incorporated in its entirety herein by reference. Scoring matrix 310 provides values (e.g., "scores") indicative of weather-based demand as a function of categories for two category weather data types. In scoring matrix 310, for example, weather-based demand for various combinations of temperature and precipitation category weather data is scored as integers in which −2 corresponds to "most unfavorable", −1 corresponds to "unfavorable", 0 corresponds to "typical", 1 corresponds to "favorable", and 2 corresponds to "most favorable". Values in scoring matrix 310 can be determined from an analysis of normalized proxy sales history data for the specific product vis-à-vis the category weather data types used in scoring matrix 310 for a specific location and a specific time period. The analysis can use statistical techniques, expert assessment, expert definition, or any combination of the foregoing.

Practical applications of such a weather-based demand score require that it be expressed relative to an understood baseline of weather-based demand for the product, which can be determined from an analysis of normalized proxy sales history data for the specific product. Baseline demand can be expressed as an average demand. The average demand can be expressed in terms of average demand from the previous year, the previous two years, "normal" averages over a multi-year span, or the like. However, the skilled artisan will understand other means by which baseline demand could be expressed. The present invention is not limited to the expressions of baseline demand described above.

For example, if Table 250 at FIG. 2B includes recorded observations of category temperature data and category precipitation in the MSA designated UK002 for July 2000 and forecasts of category temperature data and category precipitation data in the MSA designated UK002 for July 2001, then scoring matrix 310 at FIG. 3 can be used to forecast weather-based demand for the specific product in the MSA designated UK002 for July 2001.

Record 254 of Table 250 at FIG. 2B shows forecasted category temperature data of "very warm" and category precipitation data of "showers" in the MSA designated UK002 for July 2001. With category temperature data of "very warm" and category precipitation data of "showers", scoring matrix 310 at FIG. 3 shows a weather-based demand score of 2 for the specific product. Record 259 of Table 250 at FIG. 2B shows recorded category temperature data of "seasonal" and category precipitation data of "dry" in the MSA designated UK002 for July 2000. With category temperature data of "seasonal" and category precipitation data of "dry", scoring matrix 310 at FIG. 3 shows a weather-based demand score of 0 for the product.

Returning to FIG. 1, recombination processor 102 can receive, for the product in the MSA designated UK002, the weather-based demand score of 2 for July 2001 and the weather-based demand score of 0 for July 2000. Recombination processor 102 can produce normalized weather factor metric data 112 as shown in Eq. (1):

$$WFMD1 = (WBDS_{forecast} - WBDS_{baseline})/RANGE1, \qquad \text{Eq. (1)}$$

where WFMD1 is normalized weather factor metric data 112, $WBDS_{forecast}$ is the weather-based demand score based upon the forecast category weather data, $WBDS_{baseline}$ is the weather-based demand score based upon the recorded category weather data, and RANGE1 is the range of weather-based demand scores. In this example, $WBDS_{forecast}$ is 2, $WBDS_{baseline}$ is 0, and RANGE1 is 4 (from −2 to 2, inclusive). Thus, WFMD1 is +0.5, which represents a weather-based demand relationship that, relative to the range of possible values for weather-based demand scores, is fifty percent stronger in 2001 than it was in 2000. If the forecasted change in demand is scaled using volatility scaling processor 104, then the forecasted change in demand can be expressed in monetary denominations, units to be sold, or the like.

Optionally, if analysis of normalized proxy sales history data for other products (in the same or other specific locations and during the same or other specific time periods) vis-à-vis the category weather data types used in scoring matrix 310 produces the same values as in scoring matrix 310, then scoring matrix 310 can also be used for these other product/location/time period combinations. For example, Table 320 at FIG. 3 shows that scoring matrix 310 can be used to obtain weather-based demand scores for HVAC A/C units in the MSA designated UK002 between April and August, for AUTO A/C units in the MSA designated UK026 between May and August, and for other product/location/time period combinations. The skilled artisan will recognize that, in a computer system implementation, use of Table 320 and similar such tables can reduce the amount of memory needed to realize the present invention.

Weather Indices Templates

Figure 4:
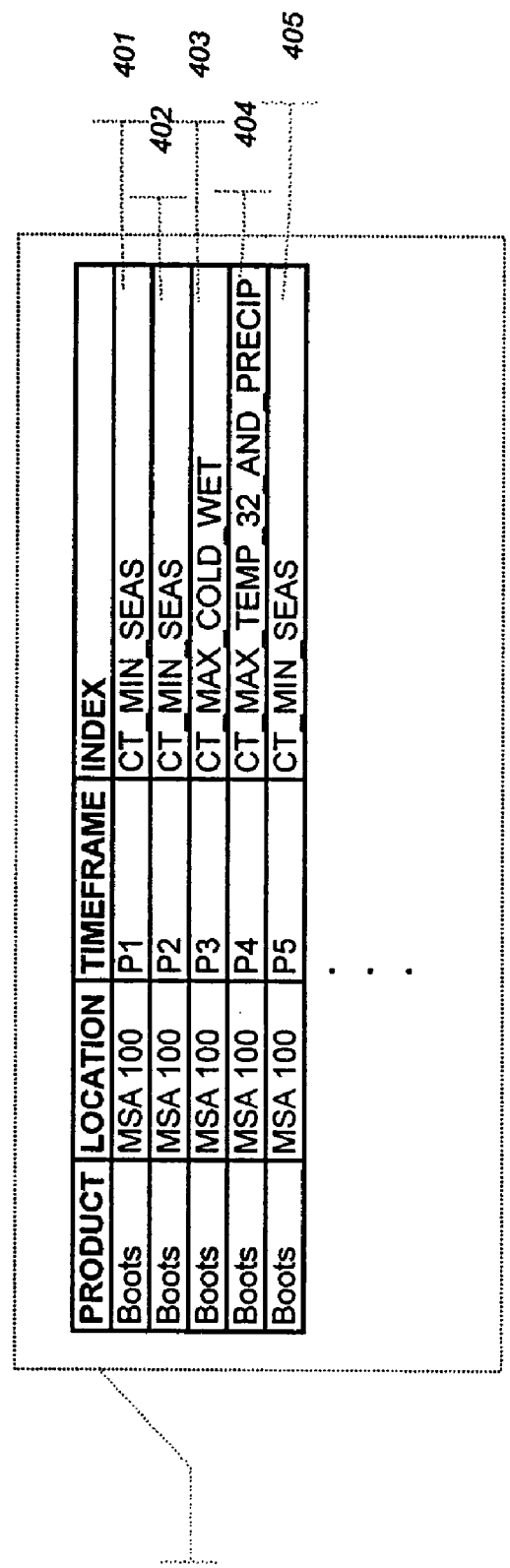
FIG. 4 shows weather factor relationship knowledgebase 110 with an exemplary weather indices template 400.

In a second embodiment, weather factor relationship knowledgebase 110 comprises at least one weather indices template. FIG. 4 shows weather factor relationship knowledgebase 110 with an exemplary weather indices template 400. Weather indices template 400 can identify an applicable weather index for a specific product/location/time period combination. The applicable weather index for the specific product/location/time period combination can be determined from an analysis of normalized proxy sales history data for the specific product/location/time period combination. The analysis can use statistical techniques, expert assessment, expert definition, or any combination of the foregoing. For example, correlation coefficients between the weather indices and the normalized proxy sales history data can be developed and used to identify a most applicable weather index for the specific product/location/time period combination.

Furthermore, if the same weather index is determined from analysis of normalized proxy sales history data for other products in the same specific location/time period combination, then weather indices template 400 can be modified to reference these other products in a manner similar to that in which Table 320 at FIG. 3 can be used to identify other products that use scoring matrix 310.

For example, if Table 270 at FIG. 2B includes recorded observations of index weather data in MSA 100 for period P5 in 2000 and forecasts of index weather data in MSA 100 for period P5 in 2001, then weather indices template 400 at FIG. 4 can be used to forecast weather-based demand for BOOTS in MSA 100 for period P5 in 2001.

Record 405 of weather indices template 400 identifies CT_MIN_SEAS as the applicable weather index for BOOTS in MSA 100 for period P5. For CT_MIN_SEAS, record 275 of Table 270 at FIG. 2B shows forecasted index weather data of 2 in MSA 100 for period P5 in 2001. Record 280 shows recorded index weather data of 4 in MSA 100 for period P5 in 2000.

Returning to FIG. 1, recombination processor 102 can receive, for BOOTS in MSA 100, forecasted index weather data of 2 for period P5 in 2001 and recorded index weather data of 4 for period P5 in 2000. Recombination processor 102 can produce normalized weather factor metric data 112 as shown in Eq. (2):

$$WFMD2 = (IWD_{forecast} - IWD_{baseline})/RANGE2, \qquad \text{Eq. (2)}$$

where WFMD2 is normalized weather factor metric data 112, $IWD_{forecast}$ is the forecasted index weather data, $IWD_{baseline}$ is the recorded index weather data, and RANGE2 is the range of values for index weather data. In this example, $IWD_{forecast}$ is 2, $IWD_{baseline}$ is 4, and RANGE2 is 7 (because the time period used in Table 270 at FIG. 2B is a week). Thus, WFMD2 is −0.28, which represents a weather-based demand relationship that, relative to the range of possible values for index weather data, is twenty-eight percent weaker in 2001 than it was in 2000. If the forecasted change in demand is scaled using volatility scaling processor 104, then the forecasted change in demand can be expressed in monetary denominations, units to be sold, or the like.

Proxy Model Conditions Templates

In a third embodiment, weather factor relationship knowledgebase 110 comprises at least one proxy model conditions template 500. FIG. 5 shows weather factor relationship knowledgebase 110 with an exemplary proxy model conditions template 500. Proxy model conditions template 500 provides, for a specific product/location/time period combination, a weather-based demand coefficient for at least one actual weather data type, and historically modeled minimal and maximal values. In proxy model conditions template 500, for example, temperature-based demand coefficients and precipitation-based demand coefficients are shown for demand for BOOTS in MSA 100 for various periods of time. In forecasting weather-based demand, minimal and maximal values provide, respectively, lower and upper limits. The lower and the upper limits determine the forecasted weather-based demand in the event that actual weather data is at such an extreme value that the relationship between demand and the weather condition ceases to be elastic.

Weather-based demand coefficients in proxy model conditions template 500 can be determined from an analysis of normalized proxy sales history data for the combination of BOOTS and MSA 100 for the shown periods of time vis-à-vis the actual weather data types used in proxy model conditions template 500. Minimal and maximal values can also be determined from an analysis of normalized proxy sales history data for the combination of BOOTS and MSA 100 for the shown periods of time. The analysis can use statistical techniques, expert assessment, expert definition, or any combination of the foregoing.

For example, if Table 210 at FIG. 2A includes recorded observations of actual temperature data and actual precipitation data in MSA 100 data for period P3 in 2000 and forecasts of actual temperature data and actual precipitation data in MSA 100 for period P3 in 2001, then proxy model conditions template 500 at FIG. 5 can be used to forecast weather-based demand for BOOTS in MSA 100 for period P3 in 2001.

Record 223 of Table 210 at FIG. 2A shows forecasted actual temperature data of 56.0 in MSA 100 for period P3 in 2001. Record 224 shows forecasted actual precipitation data of 2.68 in MSA 100 for period P3 in 2001. For BOOTS in MSA 100 and period P3, proxy model conditions template 500 at FIG. 5 shows, at record 503, a temperature-based demand coefficient of 0.0167, a precipitation-based demand coefficient of 0.053, a minimal value of 0.133, and a maximal value of 1.06.

Returning to FIG. 1, recombination processor 102 can receive forecasted actual temperature data of 56.0, forecasted actual precipitation data of 2.68, temperature-based demand coefficient of 0.0167, precipitation-based demand coefficient of 0.053, minimal value of 0.133, and maximal value of 1.06. Recombination processor 102 can produce forecast weather-based demand as defined by Eqs. (3) and (4):

$$WBD_{forecast} = (FATD)(TBDC) + (FAPD)(PBDC), \quad \text{Eq. (3)}$$

$$Min \leq WBD_{forecast} \leq Max, \quad \text{Eq. (4)}$$

where $WBD_{forecast}$ is the forecast weather-based demand, FATD is the forecasted actual temperature data, TBDC is the temperature-based demand coefficient, FAPD is the forecasted actual precipitation data, PBDC is the precipitation-based demand coefficient, Min is the minimal value, and Max is the maximal value. In this example, FATD is 56.0, TBDC is 0.0167, FAPD is 2.68, PBDC is 0.053, Min is 0.133, and Max is 1.06. Thus, because $WBD_{forecast}$ calculated by Eq. (3) is 1.077, which is greater than Max, $WBD_{forecast}$ is set equal to Max: 1.06.

Forecast weather-based demand can be compared with a baseline weather-based demand to produce normalized weather factor metric data 112. Record 211 of Table 210 at FIG. 2A shows recorded actual temperature data of 45.0 in MSA 100 for period P3 in 2000. Record 212 shows recorded actual precipitation data of 0.9 in MSA 100 for period P3 in 2000.

Returning to FIG. 1, recombination processor 102 can receive recorded actual temperature data of 45.0, recorded actual precipitation data of 0.9, temperature-based demand coefficient of 0.0167, precipitation-based demand coefficient of 0.053, minimal value of 0.133, and maximal value of 1.06. Recombination processor 102 can produce baseline weather-based demand as defined by Eqs. (5) and (6):

$$WBD_{baseline} = (RATD)(TBDC) + (RAPD)(PBDC), \quad \text{Eq. (5)}$$

$$Min \leq WBD_{baseline} \leq Max, \quad \text{Eq. (6)}$$

where $WBD_{baseline}$ is the baseline weather-based demand, RATD is the recorded actual temperature data, and RAPD is the recorded actual precipitation data. In this example, RATD is 45.0, TBDC is 0.0167, RAPD is 0.9, PBDC is 0.053, Min is 0.133, and Max is 1.06. Thus, because $WBD_{baseline}$ calculated by Eq. (5) is 0.799, which is between Min and Max, $WBD_{baseline}$ is set equal to the value calculated in Eq. (5): 0.799.

Recombination processor 102 can produce normalized weather factor metric data 112 as shown in Eq. (7):

$$WFMD3 = (WBD_{forecast} - WBD_{baseline})/RANGE3, \quad \text{Eq. (7)}$$

where WFMD3 is normalized weather factor metric data 112 and RANGE3 is the difference between Max and Min. In this example, $WBD_{forecast}$ is 1.06, $WBD_{baseline}$ is 0.799, and RANGE2 is 0.927. Thus, WFMD3 is +0.282, which represents a weather-based demand relationship that, relative to the range between the possible values for the minimal value and the maximal value, is 28.2 percent stronger in 2001 than it was in 2000. If the forecasted change in demand is scaled using volatility scaling processor 104, then the forecasted change in demand can be expressed in monetary denominations, units to be sold, or the like.

Scaling

As described above, the present invention offers advantages to forecasting weather-based demand for a product for an entity using data that is independent of the management practices of the entity. However, when the present invention is implemented in this manner, normalized weather factor metric data 112 can be scaled to magnitudes that are consistent with product sales history data for the entity, forecast product demand for the entity, or both. As stated above, if the forecasted change in demand is scaled, then it can be expressed in monetary denominations, units to be sold, or the like.

Figure 6:
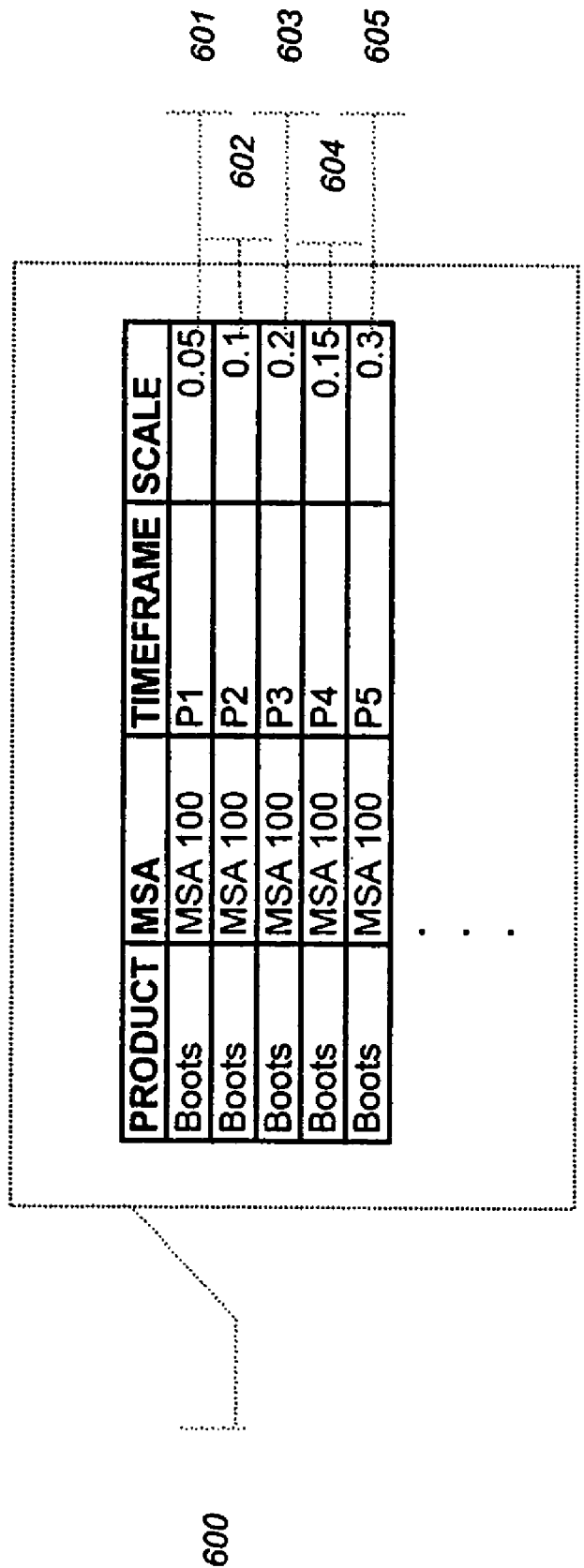
FIG. 6 shows volatility scale factor data 114 with an exemplary scaling template 600.

FIG. 6 shows volatility scale factor data 114 with an exemplary scaling template 600. Scaling template 600 provides, for at least one specific product/location/time period combination, a scale value. In scaling template 600, for example, scale values are shown for BOOTS in MSA 100 for various periods of time. Scale values in scaling template 600 can be determined using statistical techniques, expert assessment, expert definition with BOOTS sales history data for the entity, or any combination of the foregoing. (When the entity lacks BOOTS sales history data, proxy sales history data for BOOTS can be analyzed using statistical techniques, expert assessment, expert definition with proxy sales history data for BOOTS, or any combination of the foregoing.) Scale values are determined to scale normalized weather factor metric data 112 to magnitudes that are consistent with BOOTS sales history data for the entity, forecast BOOTS demand for the entity, or both.

For example, for BOOTS in MSA 100 and period P3, scaling template 600 shows, at record 603, a scale value of 0.2. Returning to FIG. 1, volatility scaling processor 104 can receive the scale value of 0.2 and normalized weather factor metric data 112 of 0.28 (from, for example, the forecasted weather-based demand from the example presented above with respect to the embodiment of the present invention in which weather factor relationship knowledgebase 110 comprises proxy model conditions template 500). Volatility scaling processor 104 can produce scaled weather factor metric data 112 as shown in Eq. (8):

$$WFMD_{scaled} = (WFMD)(SV), \quad \text{Eq. (8)}$$

where $WFMD_{scaled}$ is the scaled weather factor metric data 112 and SV is the scale value. In this example, WFMD is 0.28 and SV is 0.2. Thus, $WFMD_{scaled}$ is +0.056, the scaled forecast weather-based demand.

In certain applications, a better measure of weather-based demand can be provided from the value of scaled weather factor metric data 112 than from the value of (unscaled) normalized weather factor metric data 112.

Deaggregation

As described above, the present invention determines normalized weather factor metric data 112, which can be indicative of weather-based demand for a specific product/location/time period combination. However, in certain applications it can be desirable to determine weather-based demand for the product in a more specific location, during a more specific time period, or both.

FIG. 7 shows an exemplary representation of deaggregation data 116. Deaggregation data 116 can comprise any of a variety of tables including, but not limited to, a location deaggregation table 710 and a timeframe (i.e., time period) deaggregation table 720.

Location deaggregation table 710 provides, for a specific location/sub-location combination, a sub-location demand weight. In table 710, for example, sub-location demand weights are shown for demand in MSA 100 for various sub-locations. Sub-location demand weights can be determined from generally accepted relationships between a location and its sub-locations. The relationships can be determined from an analysis of sales history data for the client, demographics data, industry indices, or any combination of the foregoing.

Timeframe deaggregation table 720 provides, for a specific product/timeframe/sub-timeframe combination, a sub-timeframe demand weight. In table 720, for example, sub-timeframe demand weights are shown for BOOTS for various combinations of timeframes and sub-timeframes. Sub-timeframe demand weights can be determined from generally accepted relationships between a timeframe and its sub-timeframes. The relationships can be determined from an analysis of product sales history data for the client, demographics data, industry indices, or any combination of the foregoing.

The skilled artisan will appreciate other means by which deaggregation data 116 could be organized. For example, location deaggregation table 710 could provide sub-location demand weights for specific product/location/sub-location combinations, while timeframe deaggregation table 720 could provide sub-timeframe demand weights for specific timeframe/sub-timeframe combinations.

For example, in the location designated MSA 100 and the sub-location designated ST2, location deaggregation table 710 shows, at record 712, a sub-location demand weight of 1.2. For BOOTS, during the timeframe designated P1 and the sub-timeframe designated W3, timeframe deaggregation table 720 shows, at record 723, a sub-timeframe demand weight of 0.2. Returning to FIG. 1, deaggregation processor 106 can receive the sub-location demand weight of 1.2, the sub-timeframe demand weight of 0.2, and normalized weather factor metric data 112 of 0.28 (from, for example, the forecasted weather-based demand from the example presented above with respect to the embodiment of the present invention in which weather factor relationship knowledgebase 110 comprises proxy model conditions template 500). (Alternatively, deaggregation processor 106 could receive normalized weather factor metric data 112 of 0.056 from, for example, the forecasted weather-based demand from the example presented above with respect to the embodiment of the present invention in which volatility scale factor data 114 is received by volatility scaling processor 104). Deaggregation processor 106 can produce deaggregated weather factor metric data 112 as shown in Eq. (9):

$$WFMD_{deag} = (WFMD5)(SLDW)(STDW), \quad \text{Eq. (9)}$$

where $WFMD_{deag}$ is the deaggregated weather factor metric data 112, WFMD5 is either WFMD or $WFMD_{scaled}$ (depending upon whether or not WFMD was processed by volatility scaling processor 104), SLDW is the sub-location demand weight, and STDW is the sub-timeframe demand weight. In this example, WFMD5 is 0.28, SLDW is 1.2, and STDW is 0.2. Thus, $WFMD_{deag}$ is +0.0672, the forecast weather-based demand in sub-location ST2 for sub-timeframe W3.

In applications in which deaggregation is performed for location, but not for timeframe, STDW in Eq. (9) is set equal to one. Likewise, in applications in which deaggregation is performed for timeframe, but not for location, SLDW in Eq. (9) is set equal to one.

Method for Forecasting Weather-Based Demand

Figure 8:
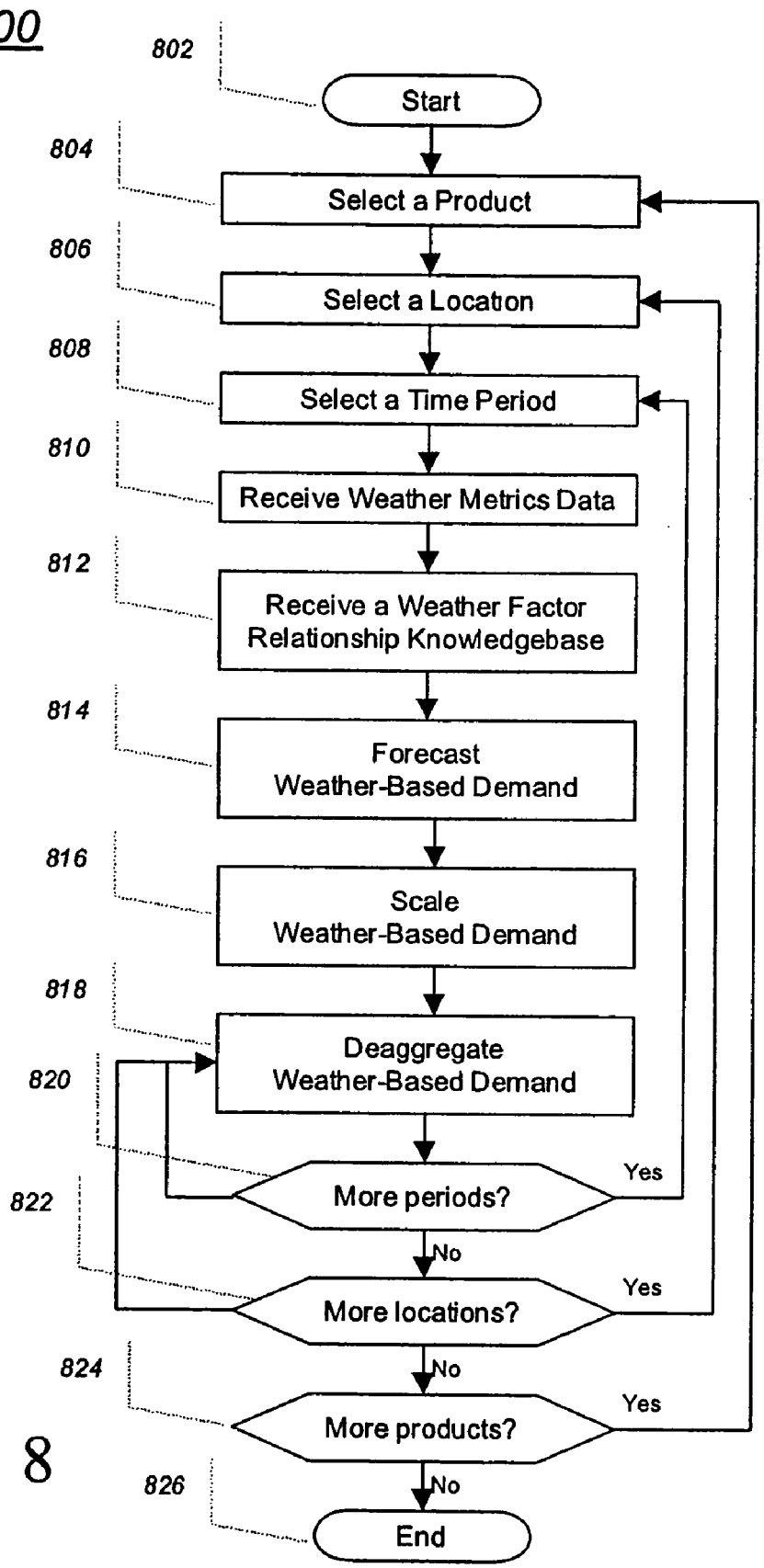
FIG. 8 shows a flow chart of a method 800 for forecasting weather-based demand.

The present invention also provides a method for forecasting weather-based demand. FIG. 8 shows a flow chart of a method 800 for forecasting weather-based demand. Method 800 begins at a step 802. If weather-based demand is to be forecasted for more than one product, then method 800 can proceed to an optional step 804. At step 804, a product is selected. If weather-based demand is to be forecasted for more than one location, then method 800 can proceed to an optional step 806. At step 806, a location is selected. For example, the location can be defined by a Metropolitan Statistical Area, a metropolitan area, or the like. If weather-based demand is to be forecasted for more than one time period, then method 800 can proceed to an optional step 808. At step 808, a time period is selected. The time period can be, but is not necessarily, a subdivision of a year.

At a step 810, weather metrics data are received. Weather metrics data include recorded observations and forecasts. Weather metrics data can comprise a variety of denominations for weather conditions, weather patterns, or both. Weather metrics data can be identified by different weather data types. The different weather data types can include, for example, actual weather data, seasonal weather data, category weather data, and index weather data. Preferably, the weather metrics data corresponds to the selected location, the selected time period, or any combination of the foregoing.

At a step 812, a weather factor relationship knowledgebase is received. The weather factor knowledgebase can be realized by a weather-impact model. The weather-impact model describes an effect that weather has had (or is expected to have) on demand for the product at the location during the time period. The effect is derived from an analysis of normalized proxy sales history data for the product. The analysis can use statistical techniques, expert assessment, expert definition, or any combination of the foregoing. For example, the weather-impact model can be one or more empirical scoring matrices, one or more weather indices templates, one or more proxy model conditions templates, or any combination of the foregoing. Preferably, the weather factor relationship knowledgebase corresponds to the selected product, the selected location, the selected time period, or any combination of the foregoing.

At a step 814, a weather-based demand is forecasted using the weather metric data and the weather factor relationship knowledgebase. The weather-based demand can be realized as normalized weather factor metric data.

Optionally, method 800 can proceed to a step 816. At step 816, the weather-based demand is scaled to magnitudes that are consistent with product sales history for an entity, forecast product demand for the entity, or both.

Optionally, method 800 can proceed to a step 818. At step 818, the weather-based demand is deaggregated. The weather-based demand can be deaggregated by location, time period, or both. For example, the selected location can be deaggregated into several sub-locations, one of which is selected. Likewise, the selected time period can be deaggregated into several sub-time periods, one of which is selected.

Optionally, method 800 can proceed to a step 820. At step 820, it is determined if there is a remaining time period. If step 818 was performed, then the remaining time period can be a remaining sub-time period. If there is a remaining sub-time period, then method 800 can proceed to step 818 where another sub-time period is selected. If there is a remaining time period, then method 800 can proceed to step 808. Preferably, method 800 proceeds to step 808 after the desired sub-time periods have been processed.

Optionally, method 800 can proceed to a step 822. At step 822, it is determined if there is a remaining location. If step 818 was performed, then the remaining location can be a remaining sub-location. If there is a remaining sub-location, then method 800 can proceed to step 818 where another sub-location is selected. If there is a remaining location, then method 800 can proceed to step 806. Preferably, method 800 proceeds to step 806 after the desired sub-locations have been processed.

Optionally, method 800 can proceed to a step 824. At step 824, it is determined if there is a remaining product. If there is a remaining product, then method 800 can proceed to step 804.

Method 800 terminates at a step 826.

Computer Program Product for Forecasting Weather-Based Demand

The present invention also provides a computer program product for forecasting weather-based demand. The computer program product has computer program code means embodied in a computer useable medium. The computer program code means comprises a first program code means, a second program code means, and a third program code means.

The first program code means are for receiving weather metrics data. Weather metrics data include recorded observations and forecasts. Weather metrics data can comprise a variety of denominations for weather conditions, weather patterns, or both. Weather metrics data can be identified by different weather data types. The different weather data types can include, for example, actual weather data, seasonal weather data, category weather data, and index weather data. Preferably, the weather metrics data corresponds to the selected location, the selected time period, or any combination of the foregoing.

The second program code means are for receiving a weather factor relationship knowledgebase. The weather factor knowledgebase can be realized by a weather-impact model. The weather-impact model describes an effect that weather has had (or is expected to have) on demand for the product at the location during the time period. The effect is derived from an analysis of normalized proxy sales history data for the product. The analysis can use statistical techniques, expert assessment, expert definition, or any combination of the foregoing. For example, the weather-impact model can be one or more empirical scoring matrices, one or more weather indices templates, one or more proxy model conditions templates, or any combination of the foregoing. Preferably, the weather factor relationship knowledgebase corresponds to the selected product, the selected location, the selected time period, or any combination of the foregoing.

The third program code means are for forecasting the weather-based demand by using the weather metrics data and the weather factor relationship knowledgebase. The weather-based demand can be realized as normalized weather factor metric data.

The computer program product can further comprise a fourth program code means. The fourth program code means can be for scaling the weather-based demand. The weather-based demand can be scaled to magnitudes that are consistent with product sales history for an entity, forecast product demand for the entity, or both.

The computer program product can further comprise a fifth program code means. The fifth program code means can be for deaggregating the weather-based demand. The weather-based demand can be deaggregated by location, time period, or both. For example, the selected location can be deaggregated into several sub-locations, one of which is selected. Likewise, the selected time period can be deaggregated into several sub-time periods, one of which is selected.

The computer program product can further comprise a sixth program code means. The sixth program code means can allow a user to select a product and cause the computer to determine if there is a remaining product.

The computer program product can further comprise a seventh program code means. The seventh program code means can allow a user to select a location and cause the computer to determine if there is a remaining location. For example, the location can be defined by a Metropolitan Statistical Area, a metropolitan area, or the like. If the selected location has been deaggregated into several sub-locations, then the remaining location can be a remaining sub-location. If there is a remaining sub-location, then the seventh program code means can allow the user to select another sub-location. If there is a remaining location, then the seventh program code means can allow the user to select another location. Preferably, the other location is selected after the desired sub-locations have been processed.

The computer program product can further comprise an eighth program code means. The eighth program code means can allow a user to select a time period and cause the computer to determine if there is a remaining time period. The time period can be, but is not necessarily, a subdivision of a year. If the selected time period has been deaggregated into several sub-time periods, then the remaining time period can be a remaining sub-time period. If there is a remaining sub-time period, then the eighth program code means can allow the user to select another sub-time period. If there is a remaining time period, then the eighth program code means can allow the user to select another time period. Preferably, the other time period is selected after the desired sub-time periods have been processed.

Environment of the Present Invention

Figure 9:
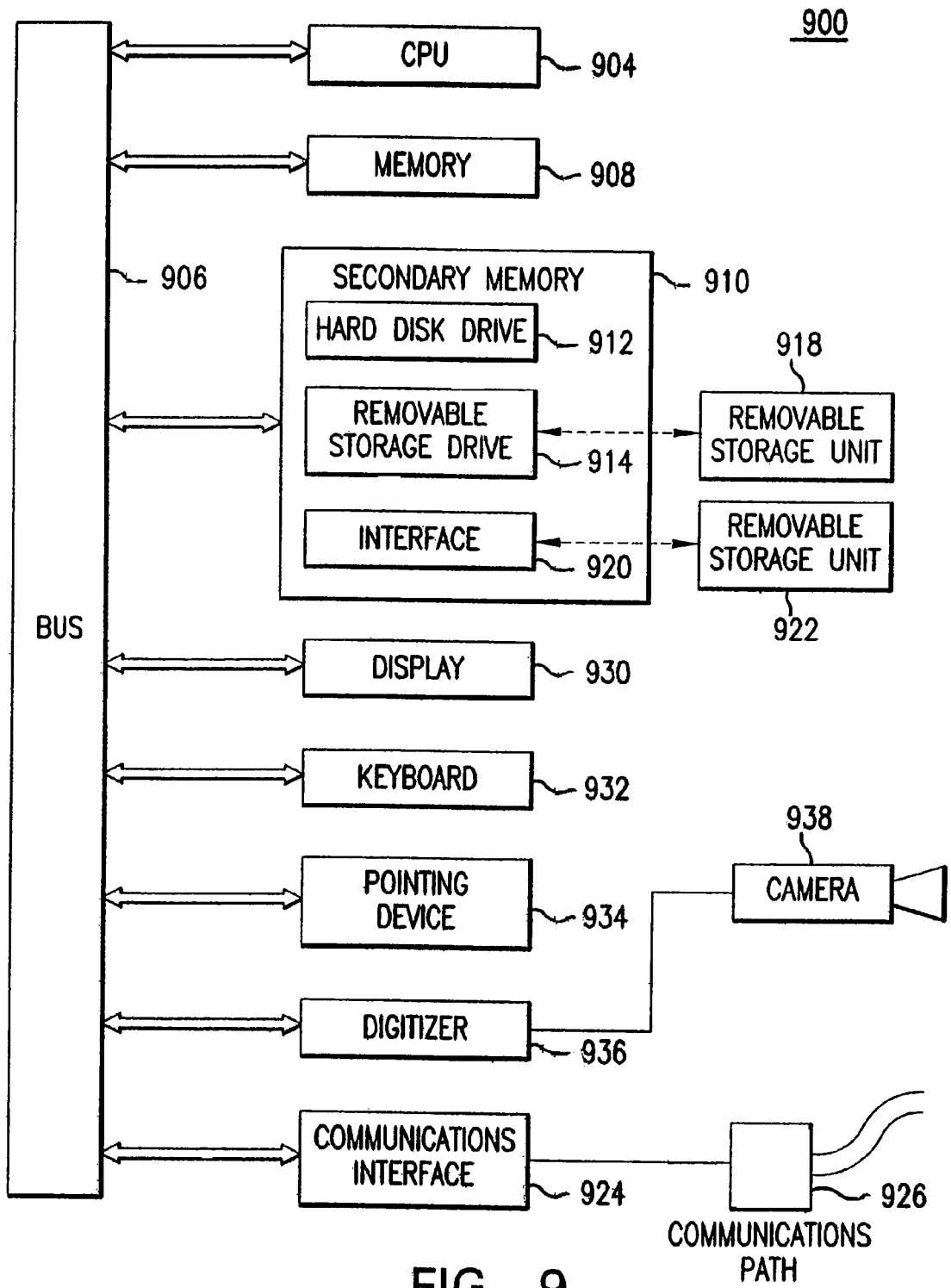
FIG. 9 is a block diagram of an example computer system 900 that can support an embodiment of the present invention.

FIG. 9 is a block diagram of an example computer system 900 that can support an embodiment of the present invention. Computer system 900 includes one or more processors, such as a central processing unit (CPU) 904. The CPU 904 is connected to a communications bus 906. Various software embodiments are described in terms of this example computer system. After reading this description, it will be apparent to a person skilled in the relevant art how to implement the present invention using other computer systems and/or computer architectures.

Computer system 900 also includes a main memory 908, preferably random access memory (RAM), and can also include a secondary memory 910. The secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918 represents a floppy disk, magnetic tape, optical disk, etc., which is read by and written to removable storage drive 914. As will be appreciated, the removable storage unit 918 includes a computer useable storage medium having stored therein computer software and/or data.

The computer system 900 also includes conventional hardware such as a display 930, a keyboard 932, and a pointing device 934. A digitizer 936 and a camera 938 can be used for capturing images to process according to the present invention. Alternatively, images can be retrieved from any of the above-mentioned memory units, or via a communications interface 924. In alternative embodiments, secondary memory 910 may include other similar means for allowing computer programs or other instructions to be loaded into computer system 900. Such means can include, for example, a removable storage unit 922 and an interface 920. Examples can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

The communications interface 924 allows software and data to be transferred between computer system 900 and external devices via communications path 926. Examples of communications interface 924 can include a modem, a network interface (such as an Ethernet card), a communications port (e.g., RS-232), etc. Software and data transferred via communications interface 924 are in the form of signals which can be electronic, electromagnetic, optical or other signals capable of being received by communications interface 924 via communications path 926. Note that communications interface 924 provides a means by which computer system 900 can interface to a network such as the Internet.

The present invention is described in terms of this example environment. Description in these terms is provided for convenience only. It is not intended that the invention be limited to application in this example environment. In fact, after reading the complete description, it will become apparent to a person skilled in the relevant art how to implement the present invention in alternative environments.

Software and Hardware Embodiments

The present invention is preferably implemented using software running (that is, executing) in an environment similar to that described above with respect to FIG. 9.

Computer programs (also called computer control logic) are stored in main memory and/or secondary memory 910. Computer programs can also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the present invention is implemented using software, the software may be stored in a computer program product and loaded into computer system 900 using removable storage drive 914, hard drive 912 or communications interface 924. Alternatively, the computer program product may be downloaded to computer system 900 over communications path 926. The control logic (software), when executed by the processor 904, causes the processor 904 to perform the functions of the present invention as described herein.

In another embodiment, the present invention is implemented primarily in hardware using, for example, hardware components such as application specific integrated circuits (ASICs). Implementation of a hardware state machine so as to perform the functions described herein will be apparent to persons skilled in the relevant art(s).

In other embodiments, the present invention is implemented in software, hardware, firmware, or any combination thereof.

CONCLUSION

While an embodiment of the present invention has been described above, it should be understood that it has been presented by way of example only, and not limitation. It will be understood by those skilled in the art that various changes in form and detail may be made therein without departing from the spirit and scope of the invention as defined in the appended claims. Thus, the breadth and scope of the present invention should not be limited by the above-described exemplary embodiment, but should be defined only in accordance with the following claims and their equivalents.

What is claimed is:

1. A system for forecasting weather-based demand, comprising:
a recombination processor wherein:
said recombination processor is configured to receive weather metrics data;
said recombination processor is configured to receive weather factor relationship weather factor relationship data from a weather factor relationship database, wherein the weather factor relationship data from the weather factor relationship database is different from the weather metrics data; and
said recombination processor is configured to produce normalized weather factor metrics data based on the weather metrics data and the weather factor relationship the weather factor relationship data from the weather factor relationship database, the normalized weather factor metrics data being indicative of a percentage increase or decrease in a demand relationship value in a first time period over a second time period.

2. The system of claim 1, wherein said weather factor relationship database is a weather-impact model.

3. The system of claim 2, wherein said weather-impact model comprises at least one of an empirical scoring matrix, a weather indices template, and a proxy model conditions template.

4. The system of claim 2, wherein said weather-impact model is derived from an analysis of normalized proxy sales history data.

5. The system of claim 4, wherein said normalized proxy sales history data are derived from at least one of previously stored sales history data for a product from an entity, sales history data for said product from a second entity, sales history data for said product from a source external to the system, sales history data for a category that includes said product, and sales history data for a proxy product, the proxy product having a similar weather-based demand relationship as said product.

6. The system of claim 1, further comprising a volatility scaling processor wherein:
said volatility scaling processor is different from said recombination processor;
said volatility scaling processor is configured to receive said normalized weather factor metric data;
said volatility scaling processor is configured to receive volatility scale factor data; and
said volatility scaling processor is configured to produce scaled weather factor metric data.

7. The system of claim 6, further comprising a deaggregation processor wherein:

said deaggregation processor is configured to receive said scaled weather factor metric data;
said deaggregation processor is configured to receive deaggregation data; and
said deaggregation processor is configured to produce deaggregated weather factor metric data.

8. The system of claim 1, further comprising a deaggregation processor wherein:
said deaggregation processor is different from said recombination processor;
said deaggregation processor is configured to receive said normalized weather factor metric data;
said deaggregation processor is configured to receive deaggregation data; and
said deaggregation processor is configured to produce deaggregated weather factor metric data.

9. A method for forecasting weather-based demand, comprising:
receiving by a processor, weather metrics data;
receiving, by the processor, weather factor relationship weather factor relationship data from a weather factor relationship database, wherein the weather factor relationship database is different from the weather metric data; and
forecasting by the processor, the weather-based demand by using normalized weather factor metrics data based on the weather metrics data and the weather factor relationship weather factor relationship data from the weather factor relationship database, the normalized weather factor metrics data being indicative of a percentage increase or decrease in a demand relationship value in a first time period over a second time period.

10. The method of claim 9, wherein the weather factor relationship database is a weather-impact model.

11. The method of claim 10, wherein the weather-impact model comprises at least one of an empirical scoring matrix, a weather indices template, and a proxy model conditions template.

12. The method of claim 10, wherein the weather-impact model is derived from an analysis of normalized proxy sales history data.

13. The method of claim 9, further comprising:
scaling the weather-based demand.

14. The method of claim 9, further comprising:
deaggregating the weather-based demand.

15. A computer program product for forecasting weather-based demand, said computer program product having computer program code means stored on a non-transitory storage medium, said computer program code means comprising:

a first program code means for causing a processor to receive weather metrics data;
a second program code means for causing the processor to receive weather factor relationship weather factor relationship data from a weather factor relationship database, wherein the weather factor relationship database is different from the weather metric data; and
a third program code means for causing the processor to forecast the weather-based demand by using normalized weather factor metrics data based on the weather metrics data and the weather factor relationship weather factor relationship data from the weather factor relationship database, the normalized weather factor metrics data being indicative of a percentage increase or decrease in a demand relationship value in a first time period over a second time period.

16. The computer program product of claim 15, wherein the weather factor relationship database is a weather-impact model.

17. The computer program product of claim 16, wherein the weather-impact model comprises at least one of an empirical scoring matrix, a weather indices template, and a proxy model conditions template.

18. The computer program product of claim 16, wherein the weather-impact model is derived from an analysis of normalized proxy sales history data.

19. The computer program product of claim 15, further comprising:
a fourth program code means for causing the processor to scale the weather-based demand.

20. The computer program product of claim 15, further comprising:
a fourth program code means for causing the processor to deaggregate the weather-based demand.

21. A non-transitory storage medium having instructions stored thereon, the instructions comprising:
instructions for receiving weather metrics data;
instructions for receiving weather factor relationship data from a weather factor relationship database; and
instructions for forecasting weather-based demand by using normalized weather factor metrics data based on the weather metrics data and the weather factor relationship data from the weather factor relationship database, the normalized weather factor metrics data being indicative of a percentage increase or decrease in a demand relationship value in a first time period over a second time period.

* * * * *